US012611918B2

(12) United States Patent
Wu

(10) Patent No.: US 12,611,918 B2
(45) Date of Patent: Apr. 28, 2026

(54) FOLDING AND FIXING STRUCTURE

(71) Applicant: Hongbo Wu, Ningbo (CN)

(72) Inventor: Hongbo Wu, Ningbo (CN)

(73) Assignee: Hongbo Wu, Ningbo (CN)

( * ) Notice: Subject to any disclaimer, the term of this patent is extended or adjusted under 35 U.S.C. 154(b) by 472 days.

(21) Appl. No.: 18/192,154

(22) Filed: Mar. 29, 2023

(65) Prior Publication Data

US 2023/0382208 A1      Nov. 30, 2023

(30) Foreign Application Priority Data

May 30, 2022    (CN) .......................... 202221359515.7

(51) Int. Cl.
  *B60J 7/14*          (2006.01)
  *B60J 7/19*          (2006.01)
(52) U.S. Cl.
  CPC .............. *B60J 7/141* (2013.01); *B60J 7/198* (2013.01)
(58) Field of Classification Search
  CPC .............. B60J 7/14; B60J 7/141; B60J 7/198
  USPC ........................... 296/100.06, 100.07, 100.09
  See application file for complete search history.

(56) References Cited

U.S. PATENT DOCUMENTS

| | | | | | |
|---|---|---|---|---|---|
| 6,899,372 | B1 * | 5/2005 | Keller | ...................... | B60J 7/141 296/100.1 |
| 11,634,017 | B2 * | 4/2023 | Facchinello | ........... | B60J 7/1607 296/100.09 |
| 11,673,459 | B2 * | 6/2023 | Dylewski, II | .......... | B60J 7/1607 296/100.09 |
| 11,718,166 | B2 * | 8/2023 | Dylewski, II | ........... | B60J 7/141 296/100.07 |
| 2016/0114666 | A1 * | 4/2016 | Xu | ........................... | B60J 7/141 296/100.07 |
| 2023/0158871 | A1 * | 5/2023 | Rossi | ........................ | B08B 1/10 296/100.09 |
| 2024/0318480 | A1 * | 9/2024 | Muirhead | ................. | E05D 1/02 |

FOREIGN PATENT DOCUMENTS

| | | | | | |
|---|---|---|---|---|---|
| CN | 111114256 | A | * | 5/2020 | ............ B60J 7/0084 |

OTHER PUBLICATIONS

English translation of CN 111114256; retrieved via Patent Translate located at www.epo.org. (Year: 2025).*

* cited by examiner

*Primary Examiner* — Jason S Daniels
(74) *Attorney, Agent, or Firm* — Quarles & Brady LLP

(57) ABSTRACT

An apparatus is provided with a folding and fixing structure for covering a carriage. A cover assembly includes multiple hinged movable plates that can be folded in a standing position or flattened to cover the carriage. A fixing assembly includes at least two locking components located on opposite sides of the cover assembly folded in the standing position. A traction assembly with at least two traction components configured to connect the cover assembly respectively to two locking components. The traction components apply pulling forces through the locking components to keep the cover assembly in the standing position stably rested on a movable cover plate laid flat on the carriage, avoiding wear and tear between the cover assembly and the carriage.

19 Claims, 17 Drawing Sheets

A

FOLDING AND FIXING STRUCTURE

CROSS-REFERENCES TO RELATED APPLICATIONS

The present application claims priority to China Application No. 202221359515.7, entitled "A Folding and Fixing Structure", filed May 30, 2022, which is commonly owned and incorporated by reference herein for all purposes.

BACKGROUND OF THE INVENTION

The present invention relates to the technical field of vehicle carriage covers, specifically a folding and fixing structure.

Car models with open-type trunks currently need a cover that can be opened to protect and conceal the contents of the trunk. This type of cover usually consists of several hinged panels that can be folded over each other when the trunk needs to be opened. However, existing technology has several issues with the folded panels of the cover using single-sided supporting rod, causing significant wear on the hinges and car body, making them difficult to handle and not user-friendly. Therefore, there is a need for improved folding and fixing structures.

BRIEF SUMMARY OF THE INVENTION

The present invention is directed to an apparatus with a folding and fixing structure that can be used for a cover of a vehicle carriage or open-type trunk. In a specific embodiment, the folding and fixing structure is provided to enable folded cover plates to remain stably open and avoid wear between the cover plates and the trunk, addressing the shortcomings of the existing technology. There are other embodiments as well.

One general aspect of the present disclosure includes an apparatus for covering a carriage or open trunk. The apparatus includes a cover assembly which may include a plurality of articulated movable plates configured to have two or more plates sequentially folded together in a standing position relative to be an unfolded plate laid horizontally. The apparatus also includes a fixing assembly that may include at least a first locking component and a second locking component respectively arranged at two locations from opposite directions of the cover assembly in the standing position. The apparatus also includes a traction assembly, may include at least a first traction component and a second traction component configured to respectively connect the first locking component and the second locking component to the cover assembly in the standing position from the opposite directions; the first traction component and the second traction component mutually restraining each other by exerting traction forces in the opposite directions respectively via the first locking component and the second locking component to maintain the cover assembly in the standing position stable relative to the carriage.

Implementations may include one or more of the following features. The apparatus where the unfolded plate of the cover assembly is movable horizontally along a support strip configured to mount on the carriage. The two or more plates sequentially folded together may include a first cover plate, a second cover plate, and a third cover plate; the third cover plate being coupled to the unfolded plate by a first hinge, the second cover plate being coupled to the third cover plate by a second hinge, the first cover plate being coupled to the second cover plate by a third hinge, the second hinge being configured to be greater in length than the first hinge and the third hinge to allow the first cover plate being folded between the second cover plate and the third cover plate in the standing position. The cover assembly further may include a setter configured to set the unfolded plate to a position on the support strip. The cover assembly further may include a flexible connector configured to protect the third hinge that rests on the unfolded plate laid horizontally.

The first locking component may include a lock housing, a first elastic element, and a latching element, the lock housing may include an inner cavity and a top opening, the latching element in l-shape may include a snap portion and a pressing portion with a guiding slope, the first elastic element and a latching element being disposed in the inner cavity with an end of the pressing portion sticking out of the lock housing and an end of the snap portion pressing against the first elastic element. The first traction component includes a long stretched portion, a first end portion and a second end portion, the first end portion may include a sleeve ring coupled to a hooking portion, the hook portion being configured to be locked by the first locking component by inserting through the top opening of the lock housing and pressing along the guided slope of the snap portion, and also unlocked by pressing the pressing portion against the first elastic element; the second end portion may include a hook configured to insert a sleeve mounted on the cover assembly. In some alternative embodiments, the first locking component may include a latch may include a latch base disposed with a plug pin against a second elastic element, and the first traction component may include a sleeve ring configured to connect the first locking component by passing the plug pin to through the sleeve ring. In some alternative embodiments, the first locking component may include a sleeve, and the first traction component may include a hook configured to connect the first locking component by inserting the hook through the sleeve.

The fixing assembly further may include a sliding setter engaged to a sliding rail configured to mount on the carriage, the sliding setter may include a locking rod connected to an operating handle, the operating handle being configured to move the locking rod through the sliding setter to either tightly press the against the sliding rail at a fixed position or release the locking rod to allow the sliding setter to be movable along the sliding rail. The second locking component may include a long stretched portion, a first end portion and a second end portion, the first end portion may include a locking plate vertically affixed to the sliding setter, the locking plate may include an L-shaped through-plate slot including a first channel in the vertical direction that connects to a second channel in the horizontal orientation, the first channel and the second channel having a same width, the first channel having a rounded end portion that is bigger than the width and the second channel having an end portion of the same width; the second end portion may include a hook configured to insert a sleeve mounted on the cover assembly. The second traction component includes a long stretched portion, a first end portion and a second end portion, the first end portion may include a corner piece including a first section with a flat plate set in parallel to the locking plate and a second section set in perpendicular to the locking plate, the second section having an anti-detachment head configured to be inserted through the rounded end portion and moved along the L-shaped through-plate slot and stopped at the end portion of the second channel; the second end portion may include a hook configured to insert a sleeve mounted on the cover assembly.

Another general aspect of the present disclosure includes an apparatus for covering a carriage. The apparatus includes a cover assembly which may include a plurality of articulated movable plates configured to be a folded state in a standing position or be deployed in a flat position for covering the carriage. The apparatus also includes a fixing assembly which may include at least one first locking component and two second locking components, the at least one first locking component being fixed at one side of the cover assembly folded in the standing position and the two second locking components being adjustably set at another side of the cover assembly in the standing position along two sliding rails configured to mount to the carriage. The apparatus also includes a traction assembly, which may include two traction components, each of the two traction components may include a fabric strap stretched crossing the cover assembly in the standing position, the fabric strap may include one end portion connected to the at least one first locking component and another end portion connected to respective one of the two second locking components, the two traction components being configured to maintain the cover assembly folded in the standing position stable relative to the carriage by exerting a pulling force through both the first locking component and the two second locking components.

It is to be appreciated that embodiments of the present invention provide many advantages over conventional techniques. Among other things, a foldable cover structure for a vehicle carriage is featured with a cover assembly characterized by a folded state with two upper ends of the traction components as pull-tabs being connected to two sides of the cover assembly and two lower ends of the pull-tabs are connected to the side panels of the carriage. Additionally, the pull-tabs apply tension to the cover assembly on both sides, balancing the tension with the weight of the cover assembly itself, just like the principle of a cable-stayed bridge, thus achieving stability when the cover assembly is folded and opened relative to the carriage.

The present invention achieves these benefits and others in the context of known technology. However, a further understanding of the nature and advantages of the present invention may be realized by reference to the latter portions of the specification and attached drawings.

Figure 1:
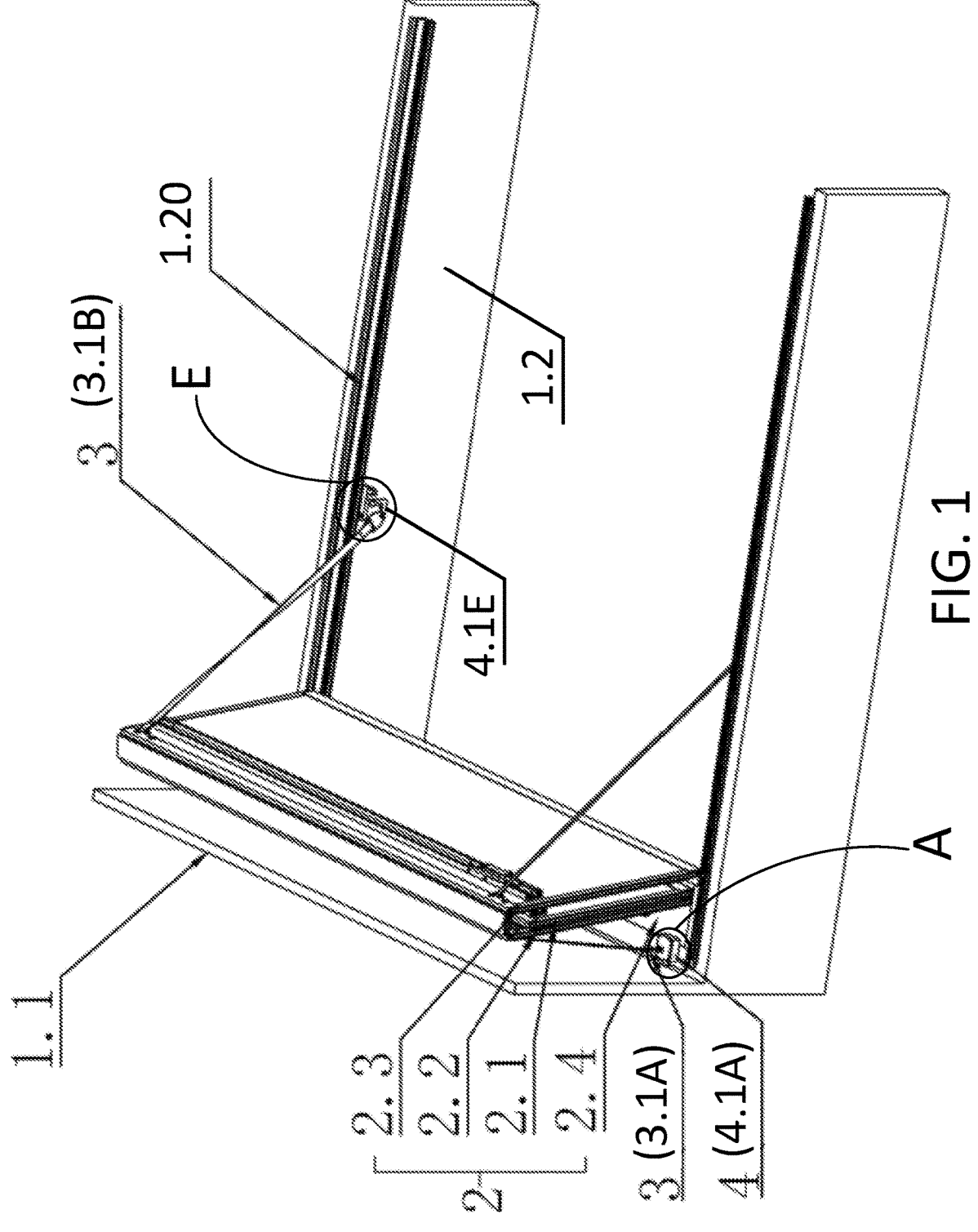
FIG. 1 is a schematic structural diagram of an apparatus for covering a vehicle carriage according to an embodiment of the present invention.

Numerical indicators for components in Figures above:

1: Carriage; 1.1: Back plate; 1.2: Side panel; 1.20: Mounting component; 1.21: Sliding rail; 1.22: Supporting strip.

2: Cover assembly; 2.1: First cover plate; 2.2: Second cover plate; 2.3: Third cover plate; 2.4: Movable cover plate; 2.5: Hinge element; 2.6: Setter; 2.7: Hinge protector.

3: Traction assembly; 3.1: Traction component; 3.11: Hooking portion; 3.12: Sleeve ring; 3.13: Hook; 3.14: Corner piece; 3.141: First section; 3.142: Second section; 3.143: Anti-detachment head.

4: Fixing assembly; 4.1: Locking component; 4.11: Latching element; 4.111: Snap portion; 4.112: Pressing portion; 4.12: Locking plate; 4.121: First channel; 4.122: Second channel; 4.13: Sleeve; 4.14: Plug pin; 4.141: Operating end; 4.2: Lock housing; 4.21: Opening; 4.3: First elastic element; 4.4: Latch base; 4.41: Vacant space; 4.42: Limiting portion; 4.43: Limiting groove; 4.5: Second elastic element.

5: Sliding setter; 5.1: Locking rod; 5.2: Operating handle.

Alphabet indicator after the numerical indicator refers to variation of the component.

DETAILED DESCRIPTION OF THE INVENTION

The present invention is directed to an apparatus with a folding and fixing structure that can be used for a cover of a vehicle carriage or open-type trunk. In a specific embodiment, the folding and fixing structure is provided, which enables folded cover plates to remain stably open and avoids wear between the cover plates and the carriage or trunk, addressing the shortcomings of the existing technology. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented with references to the drawings, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, side, one end, upper, middle, lower, close, near, away, forward, reverse, clockwise and counterclockwise have been used for convenience purposes only and are not intended to imply any particular fixed direction. Instead, they are used to reflect relative locations and/or directions between various portions of an object. These terms are only used to distinguish the components from each other for better understanding, rather than defining any directional or sequential limitations.

FIG. 1 is a schematic structural diagram of an apparatus for covering a vehicle carriage according to an embodiment of the present invention. This diagram is merely an example, which should not unduly limit the scope of the claims. One of ordinary skill in the art would recognize many variations, alternatives, and modifications. The apparatus is featured with a folding and fixing structure for a vehicle carriage. In an embodiment, the apparatus includes cover assembly 2 mounted on carriage 1. Cover assembly 2 includes multiple hinged movable cover plates that can be folded or laid flat on carriage 1. Carriage 1 may be characterized by back plate 1.1 connected to two side panels 1.2. Back plate 1.1 may be taller than the two side panels 1.2. In an embodiment shown in FIG. 1, cover assembly 2 is in a folded state with three folded cover plates, i.e., a first cover plate 2.1, a second cover plate 2.2, and a third cover plate 2.3 being folded towards back plate 1.1 to substantially open carriage 1, and one movable cover plate 2.4 being laid flat on side panels 1.2 near back plate 1.1.

The apparatus also includes a traction assembly 3, which includes at least two traction components 3.1A and 3.1B. Both of the two traction components are coupled to upper regions of cover assembly 2 respectively from two sides of cover assembly 2. The apparatus further includes a fixing assembly 4, which includes two locking components 4.1A and 4.1E mounted near or on side panel 1.2 of the carriage 1. One locking component 4.1A is positioned near back plate 1.1, while the other locking component 4.1E is positioned away from back plate 1.1. A first traction component 3.1A includes a long stretched portion, a first (lower) end portion, and a second (upper) end portion. The first (lower) end portion of first traction component 3.1A is connected to locking component 4.1A on the side near back plate 1.1. The second (upper) end portion of first traction component 3.1A is connected to an upper position of the cover assembly (not directly visible) that is held to a folded standing position as shown. A second traction component 3.1B also includes a long stretched portion, a first (lower) end portion, and a second (upper) end portion. The first (lower) end portion of second traction component 3.1B is connected to the locking component 4.1E away from back plate 1.1. The long stretched portion of each traction component can be a hard material, for example, a metal rod, with properly selected length to fit overall structure. The long stretched portion of each traction component can be a semi-flexible material, for example, a steel wire rope, with a properly selected length. The long stretched portion can also be a soft fabric strap that can sustain proper traction forces. Both traction components 3.1A and 3.1B apply tension in their long stretched portions to the cover assembly 2 through locking components 4.1A and 4.1E to keep cover assembly 2 in a folded standing position relative to carriage 1.

Specifically, movable cover plate 2.4 of cover assembly 2 can be fixed and laid flat on carriage 1, and third cover plate 2.3 is hinged at the boundary of the cover plate 2.4. Cover assembly 2 also provides a mounting position for locking component 4.1A adjacent to back plate 1.1. As an option, traction component 3.1 is specifically a traction belt, which, in a tightened state, maintains the balance of cover assembly 2 when opened in the folded state as shown.

Note that there are two side panels 1.2, so optionally, two traction components 3.1A are used near the back plate side, one near one of the two side panels 1.2 of carriage 1 and another one near another side panel. For the same reason, two traction components 3.1B are used away from the back plate near respective two side panels. In the folded state of the cover assembly 2, two upper ends of the two traction components 3.1A near the back plate are respectively connected to the two upper regions of cover assembly 2, i.e., one upper region of cover plate 2.2 near one side panel and another upper region of the cover plate 2.2 near the other side panel (not visible in FIG. 1), and two lower ends of the two traction components 3.1A are respectively connected to the two locking components 4.1A near the back plate (one not visible in FIG. 1). At the same time, two upper ends of the two traction components 3.1B away from the back plate are respectively connected to two upper regions of the cover plate 2.3 and two lower ends of the two traction components 3.1B are connected to two locking components 4.1E at opposite sides of the two side panels 1.2 of carriage 1 (as shown in FIG. 1). Traction components 3.1 can apply tension to cover assembly 2 on both sides, so that the tension on both sides of cover assembly 2 balances with its own gravity, thereby achieving stability of cover assembly 2 in the folded state relative opening of carriage 1. Using two traction components 3.1A in tension to hold cover assembly 2 from the side near the back plate instead of letting the cover assembly leaned on the back plate avoids friction wear and other mechanical damages from the contact between cover assembly 2 and back plate 1.1.

In an embodiment, cover assembly 2 includes a first cover plate 2.1, a second cover plate 2.2, and a third cover plate 2.3 sequentially hinged together. Third cover plate 2.3 is hinged to movable cover plate 2.4 laid flat (or maybe fixed) on the carriage. Hinge elements (see FIG. 15) are provided between adjacent cover plates, and the length of the hinge elements between different pair of adjacent cover plates are set differently. For example, hinge elements between second cover plate 2.2 and third cover plate 2.3 is greater in length than the other hinge elements to allow first cover plate 2.1 to be accommodated between the second cover plate 2.2 and third cover plate 2.3 in the folded state. (Note, the folding starts from the first cover plate towards the second cover plate, then together they are folded towards the third cover plate). In the final folded state, the second cover plate 2.2 is adjacent to back plate 1.1 and is connected to traction components 3.1A, while third cover plate 2.3 is away from back plate 1.1 and connected to traction components 3.1B.

To facilitate disengagement or connection with the locking components (4.1A and 4.1E) in the working state of the traction component (3.1A and 3.1B) and the cover assembly 2, at least one locking component, for example, locking component 4.1E, can slide in the direction of the corresponding traction component, for example, 3.1B, under tension, so that the locking component can switch between the disengaged and connected states with traction component 3.1.

In an implementation, the pulling force exerted by each pair of traction components (3.1A and 3.1B) on the cover assembly 2 depends on the position of the corresponding pair of locking components where the lower ends of the traction components connect. To facilitate the adjustment of the position of the traction component (e.g. 3.1B) and the release of the force exerted by the traction component (e.g. 3.1B) on cover assembly 2, at least one of the locking components (e.g., 4.1E) is provided with a sliding setting on each of the two side panels 1.2 of the carriage 1, so as to adjust the relative positions of the lower ends of the traction components and achieve the adjustment of the pulling force exerted on cover assembly 2. Optionally, carriage 1 also includes a mounting component 1.20 set along a top rim of each side panel 1.2. Mounting component 1.20 can be configured to affix a sliding rail (not visible in FIG. 1) so that locking component 4.1E can be affixed to a sliding component that can flexibly adjusted or fixed along the sliding rail to adjust its positions relative to cover assembly 2. More details about the structure of the sliding rail and locking component 4.1E can be found below in the specification.

Figure 2:
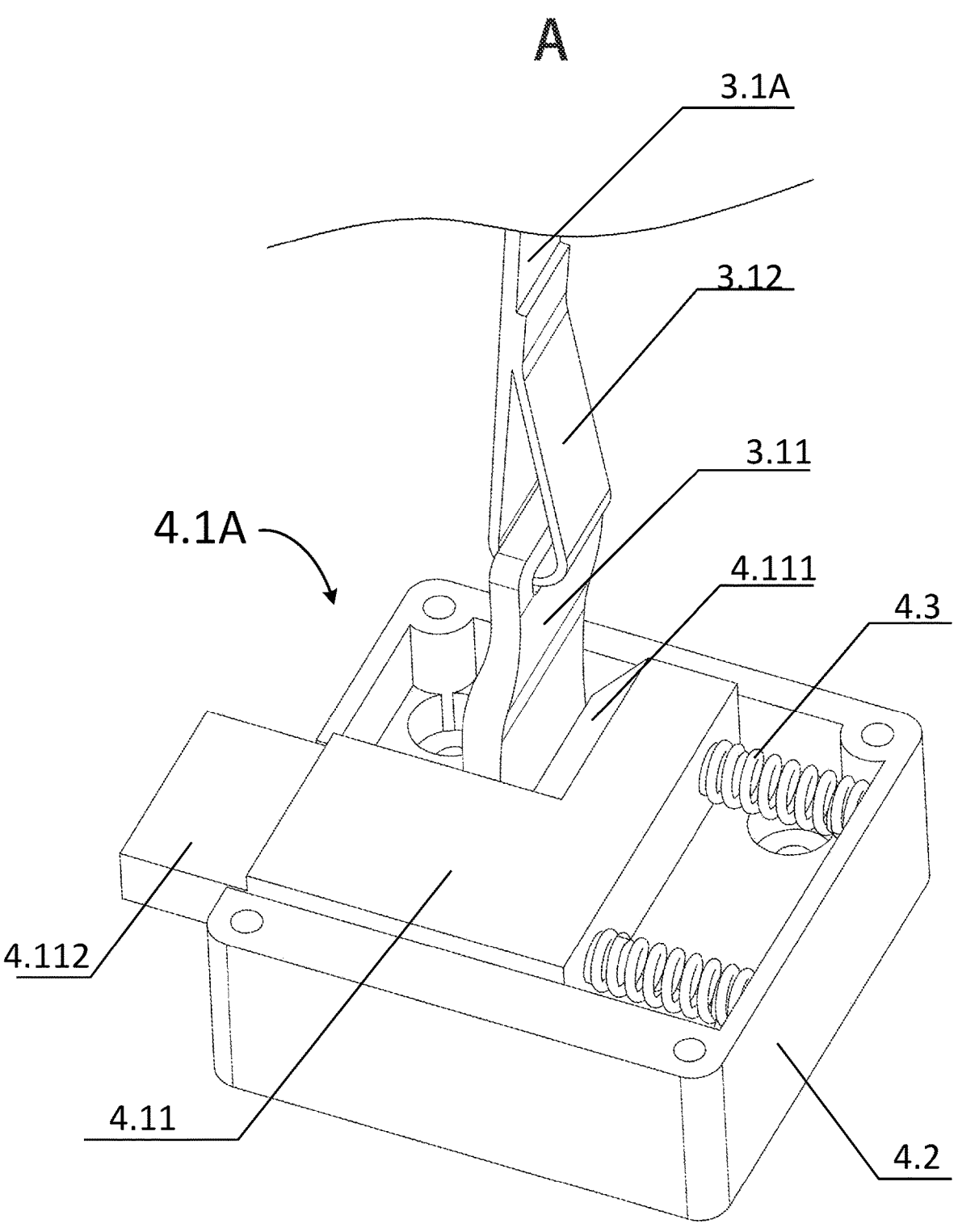
FIG. 2 is an enlarged view of a traction component connecting to a locking component in region A of FIG. 1 according to the embodiment of the present invention.

FIG. 2 is an enlarged view of a traction component connecting to a locking component in region A of FIG. 1 according to the embodiment of the present invention. This diagram is merely an example, which should not unduly limit the scope of the claims. One of ordinary skill in the art would recognize many variations, alternatives, and modifications. FIG. 2, in a specific embodiment, shows a structure of a local region A of the apparatus with a traction component 3.1A of the traction assembly 3 connecting to a locking component 4.1A of fixing assembly 4. As shown, locking component 4.1A includes a lock housing 4.2 with an inner cavity, and a first elastic element 4.3 and a latching element 4.11 being provided in the inner cavity. Locking component 4.1A uses latching element 4.11 to perform lock and unlock operations when connecting to traction component 3.1A. Traction component 3.1A, for example, a traction belt, is provided at its end with a sleeve ring 3.12 engaged with a hooking portion 3.11. The upper part of lock housing 4.2 is provided with an opening 4.21 that communicates with the inner cavity. Hooking portion 3.11 can enter the inner cavity through opening 4.21 and cooperate with latching element 4.11 disposed in the inner cavity of lock housing 4.2. Latching element 4.11 and first elastic element 4.3 are arranged according to the tension direction of traction component 3.1A, for example, arranged in a direction that is approximately perpendicular to the surface of the traction belt.

Specifically, latching element 4.11 has an L-shaped structure, one end of which abuts first elastic element 4.3. The other end of latching element 4.11 is provided with a snap portion 4.111 with a shorter length and a width that matches to hooking portion 3.11, and a pressing portion 4.112 with a longer length that extends outside lock housing 4.2. The upper side of snap portion 4.111 is provided with a guiding slope. In actual operation, hooking portion 3.11 can be directly pressed into the opening 4.21 on top cover of lock housing 4.2 and directly cooperate with snap portion 4.111 through the guiding slope and be locked by lower side of snap portion 4.111, making the operation convenient. Hooking portion 3.11 can be easily released or unlocked by pushing pressing portion 4.12 that sticks out of the lock housing 4.2.

Optionally, both lock housing 4.2 and latching element 4.11 are provided with protrusions for fitting with first elastic element 4.3.

Figure 3:
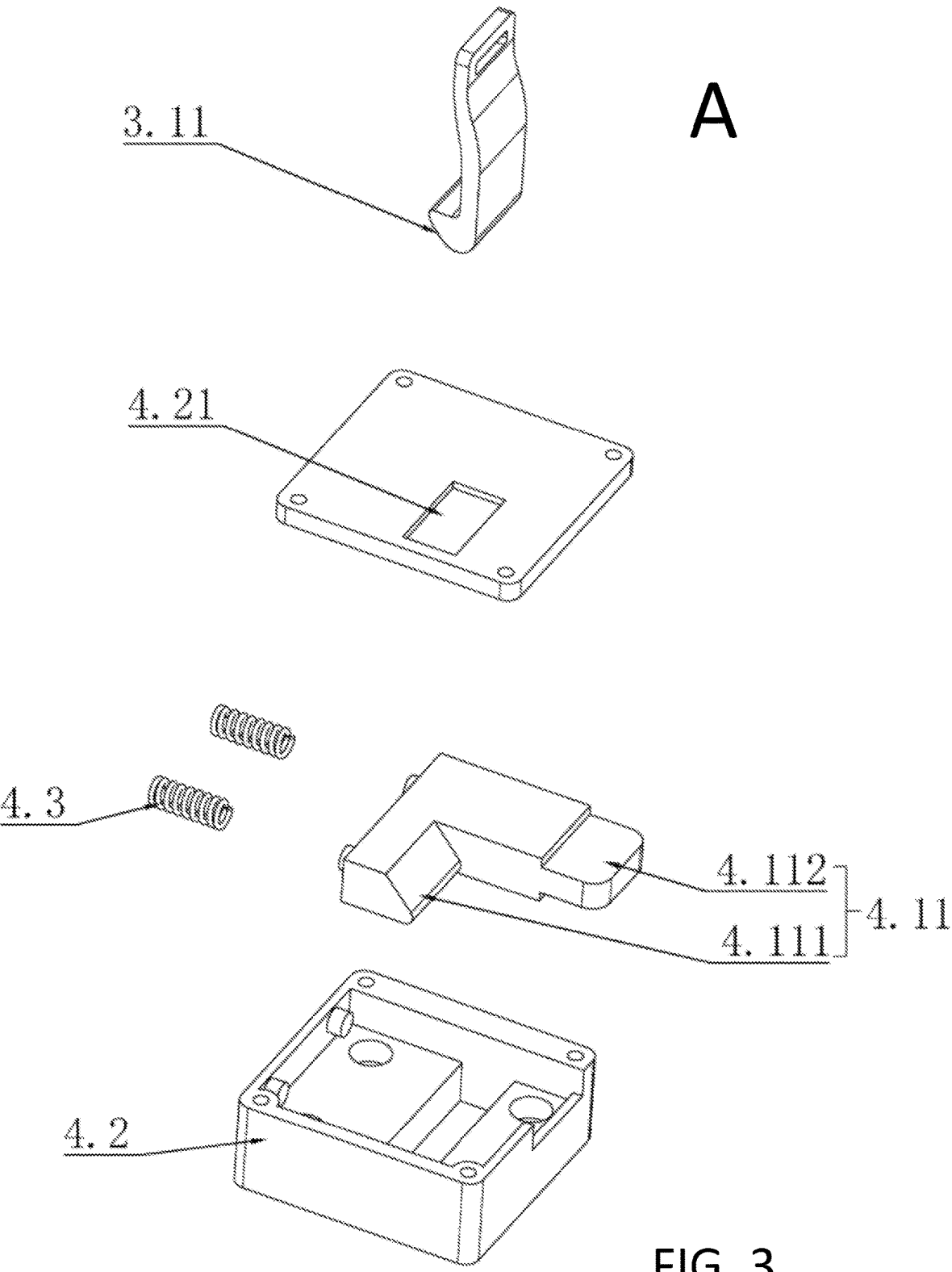
FIG. 3 is an exploded view of the locking component in FIG. 2 according to the embodiment of the present invention.

FIG. 3 is an exploded view of the locking component in FIG. 2 according to the embodiment of the present invention. This diagram is merely an example, which should not unduly limit the scope of the claims. One of ordinary skill in the art would recognize many variations, alternatives, and modifications. As shown, hook portion 3.11, having a matching width of opening 4.21 on the top cover of lock housing 4.2, is able to enter the housing through the opening to engage the latching element 4.11. Latching element 4.11 has a L-shaped structure with snap portion 4.111 of a shorter length joined with the pressing portion 4.112 of a longer length. Opening 4.21 is aligned to a guided slope of snap portion 4.111 with a same width matching that of the hook portion 3.11. The wider side of latching element 4.11 is able to engage with first elastic element 4.3, e.g., two elastic rings. Both latching element 4.11 and elastic rings are disposed, in the orientation as disclosed, into the inner cavity of lock housing 4.2. Note, the inner cavity is structured to have a concaved region to accommodate hook portion 3.11 snap-locked by snap portion 4.111 after the hook portion being pressed through the guided slope downward.

Figure 4:
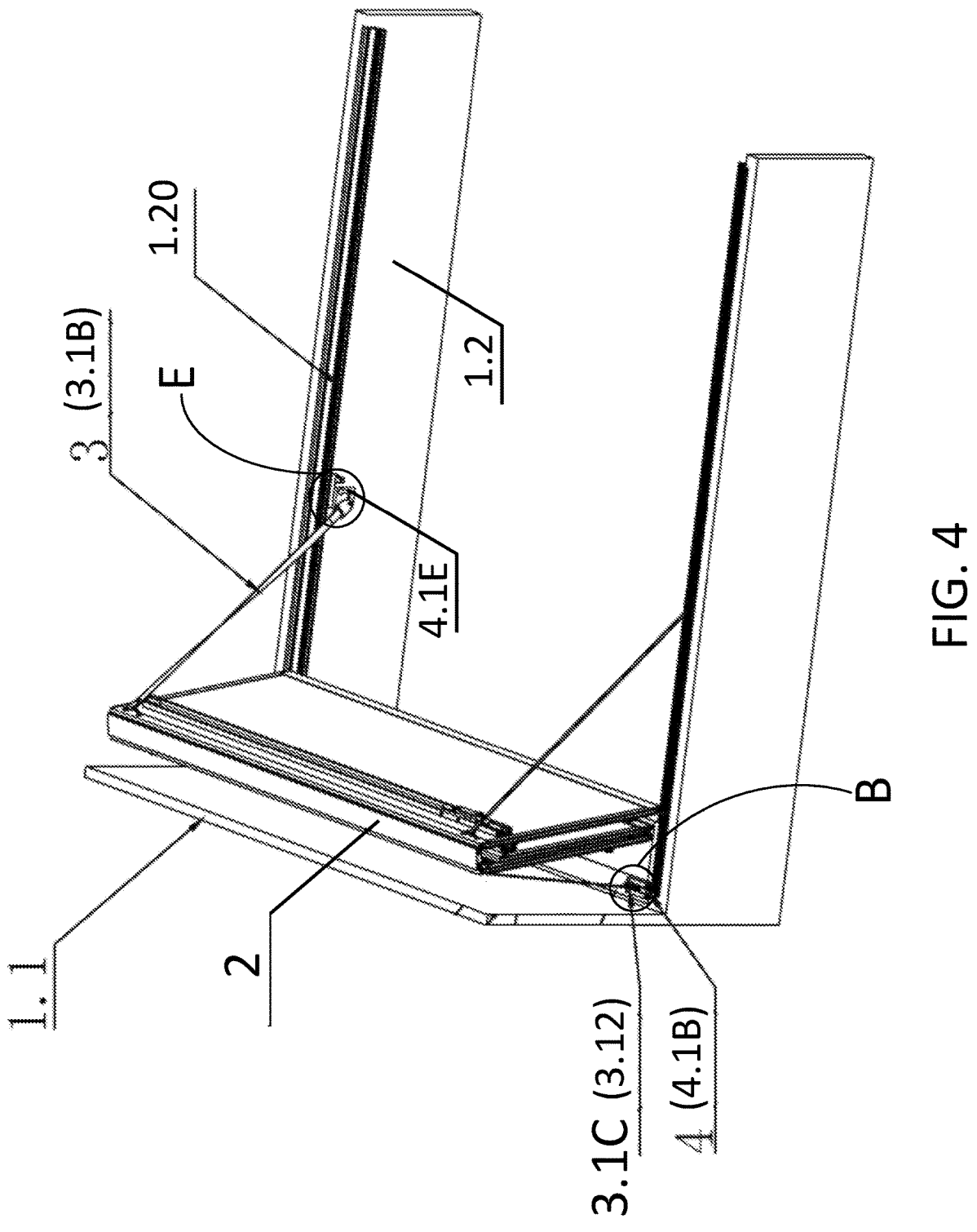
FIG. 4 is a schematic structure diagram of an apparatus for covering a vehicle carriage according to another embodiment of the present invention.

FIG. 4 is a schematic diagram of an overall structure of an apparatus for covering vehicle carriage according to a fourth embodiment of the present invention. This diagram is merely an example, which should not unduly limit the scope of the claims. One of ordinary skill in the art would recognize many variations, alternatives, and modifications. As shown, a folding and fixing structure for a vehicle carriage is provided. In an embodiment, the apparatus or the structure provided in FIG. 4 includes a cover assembly 2 mounted on the vehicle carriage. The vehicle carriage is the same or similar to carriage 1 of FIG. 1, having a back plate 1.1 and two side panels 1.2. Along top rims of the two side panels, a mounting component 1.20 is shown. Cover assembly 2 is the same or similar to the cover assembly shown in FIG. 1. The apparatus also includes a traction assembly 3 having two pairs of contraction components 3.1C and 3.1B configured to maintain the cover assembly in a folded state that keeps the carriage (partially open). The apparatus further includes a fixing assembly 4 including at least two locking components 4.1B and 4.1E for connecting respective two ends of the two traction components (which also are coupled to upper regions of the cover assembly 2 respectively) to exert pulling forces so that the cover assembly 2 can be stably in a currently folded state. The embodiment shown in FIG. 4 is different from the embodiment shown in FIG. 1 in a region B, which shows a connection between a traction component 3.1C and a locking component 4.1B near back plate 1.1.

Figure 5:
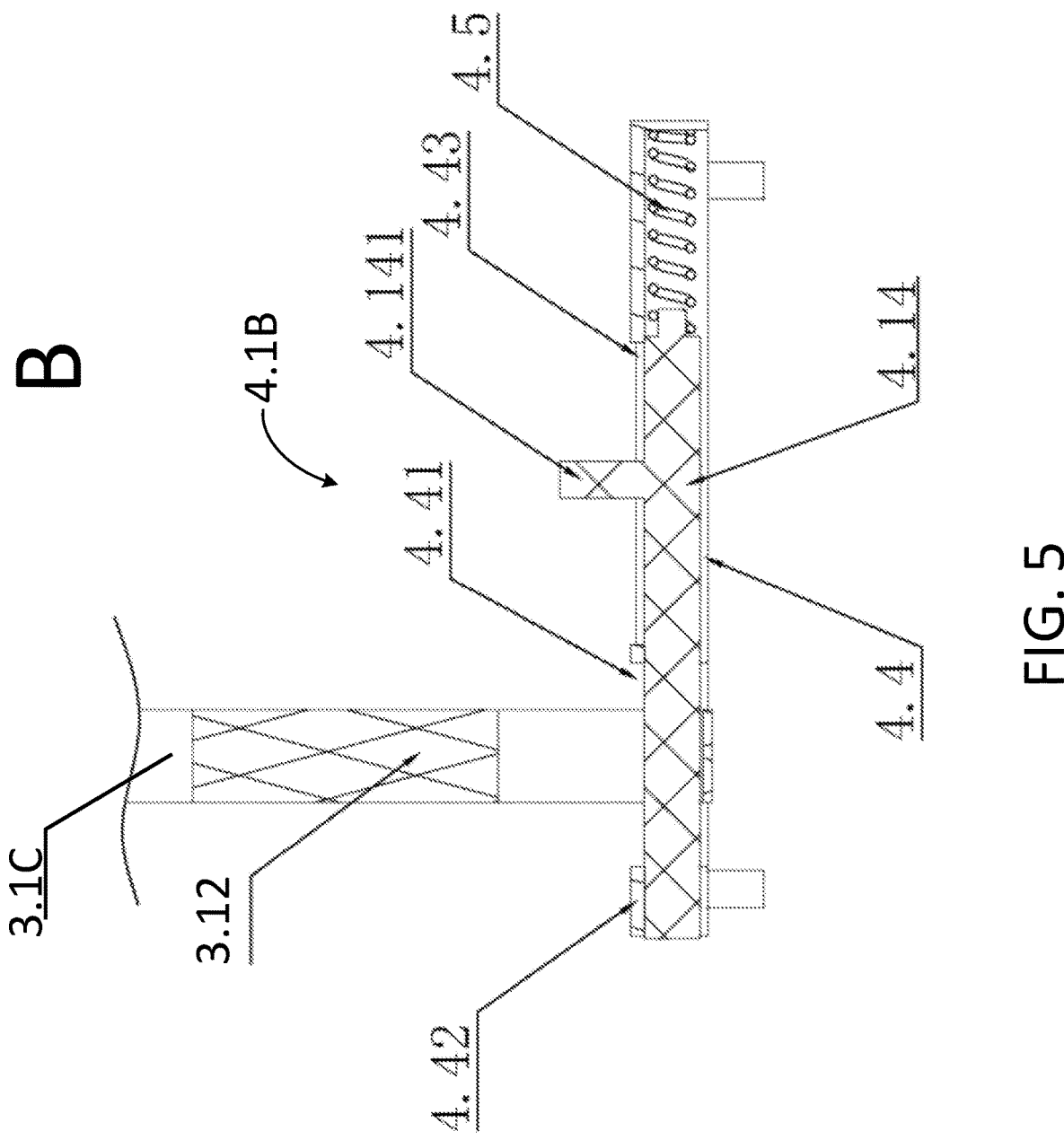
FIG. 5 is a cross-section diagram of a traction component connecting to a locking component in region B of FIG. 4 according to the embodiment of the present invention.
Figure 6:
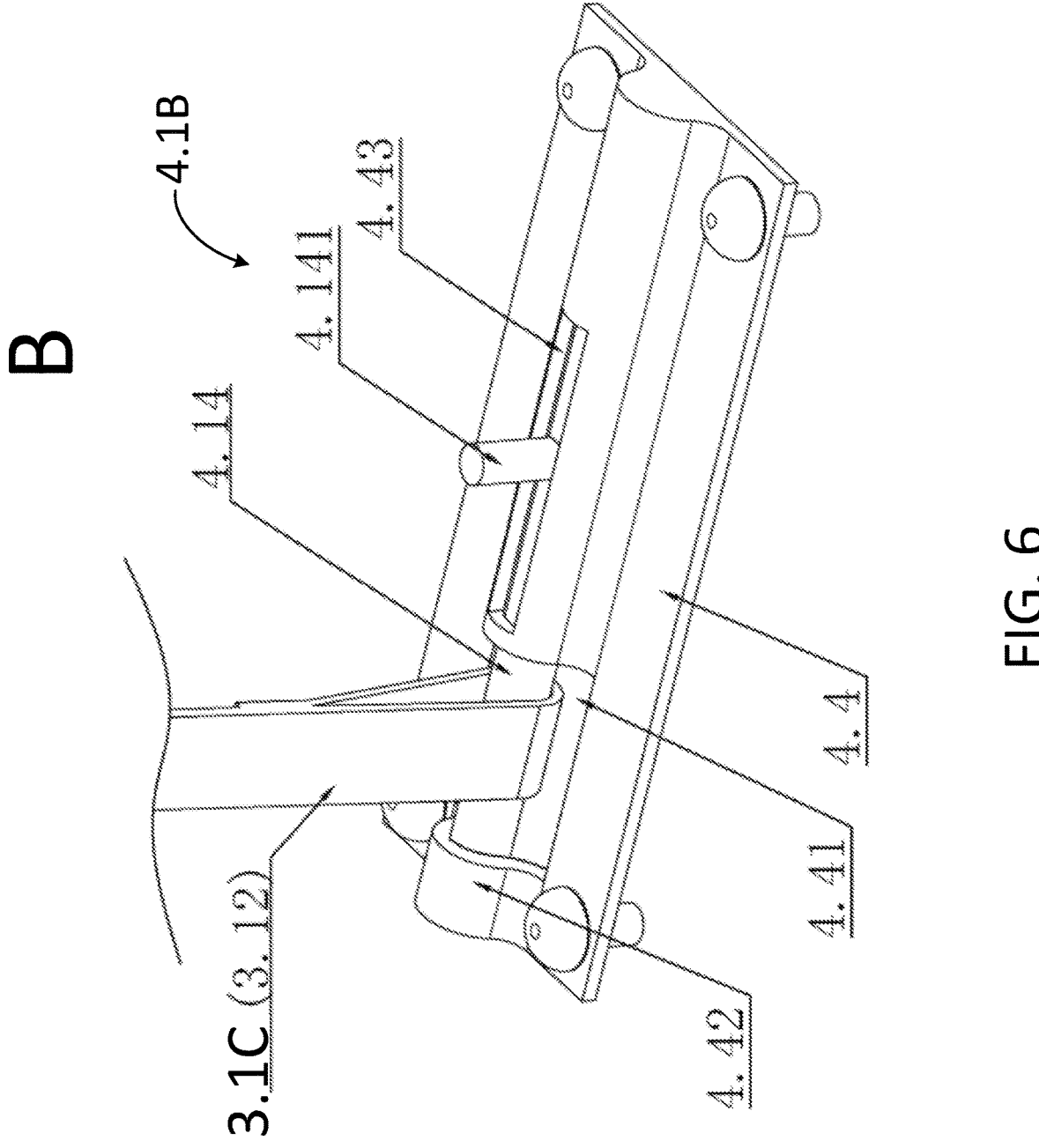
FIG. 6 is a perspective view of the traction component connecting to the locking component in region B of FIG. 4 according to the embodiment of the present invention.

FIG. 5 shows a cross-section view of a traction component connecting to a locking component in region B of FIG. 4 according to the embodiment of the present invention. Accordingly, for better illustration, FIG. 6 also shows a perspective view of the traction component connecting to the locking component in region B of FIG. 4 according to the embodiment of the present invention. This diagram is merely an example, which should not unduly limit the scope of the claims. One of ordinary skill in the art would recognize many variations, alternatives, and modifications. As shown in a cross-section diagram, traction component 3.1C has an end structure formed as a sleeve ring 3.12 coupled to locking component 4.1B. In the embodiment, locking component 4.1B includes a latch base 4.4, a plug pin 4.14 inserted through latch base 4.4, and a second elastic element 4.5 between plug pin 4.14 and the latch base 4.4. Plug pin 4.14 has an operating end 4.141, and latch base 4.4 has a limiting groove 4.43 that extends for operating end 4.141 to protrude. Sleeve ring 3.12 of traction component 3.1C is able to allow plug pin 4.14 to be inserted or removed to establish or release from the connection with locking component 4.1B.

The locking component in this embodiment provides another improvement to fixing assembly 4 of the apparatus. Latch base 4.4 is formed with a vacant space 4.41 for inserting sleeve ring 3.12 of the traction component 3.1C. Vacant space 4.41 is formed with a limiting portion 4.42 on one side, and plug pin 4.14 passes through vacant space 4.41 and limiting portion 4.42. The boundary between sleeve ring 3.12 of traction component 3.1C and vacant space 4.41 and limiting portion 4.42 is flush to limit disengagement.

Figure 7:
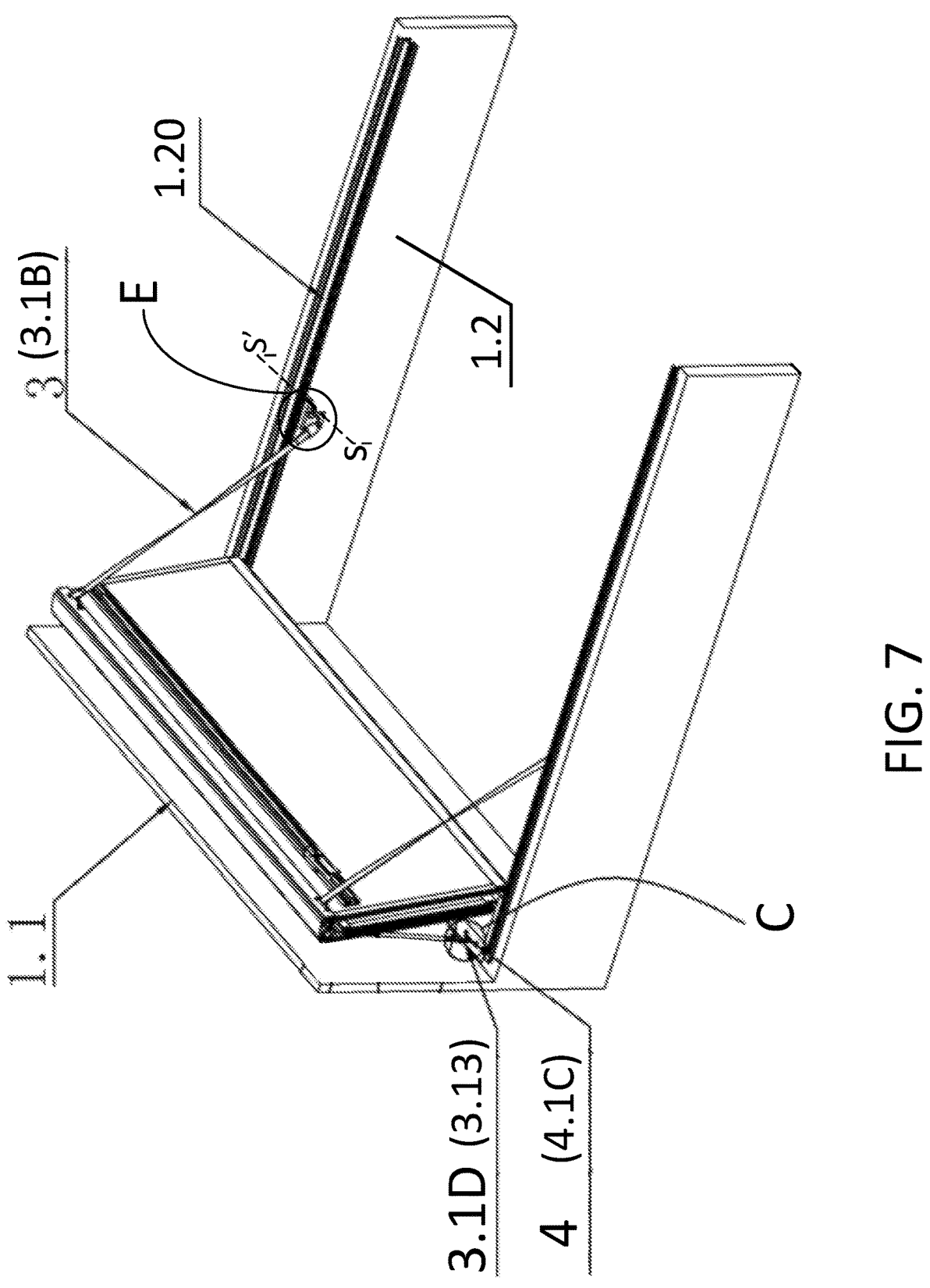
FIG. 7 is a schematic structure diagram of an apparatus for covering a vehicle carriage according to another embodiment of the present invention.
Figure 8:
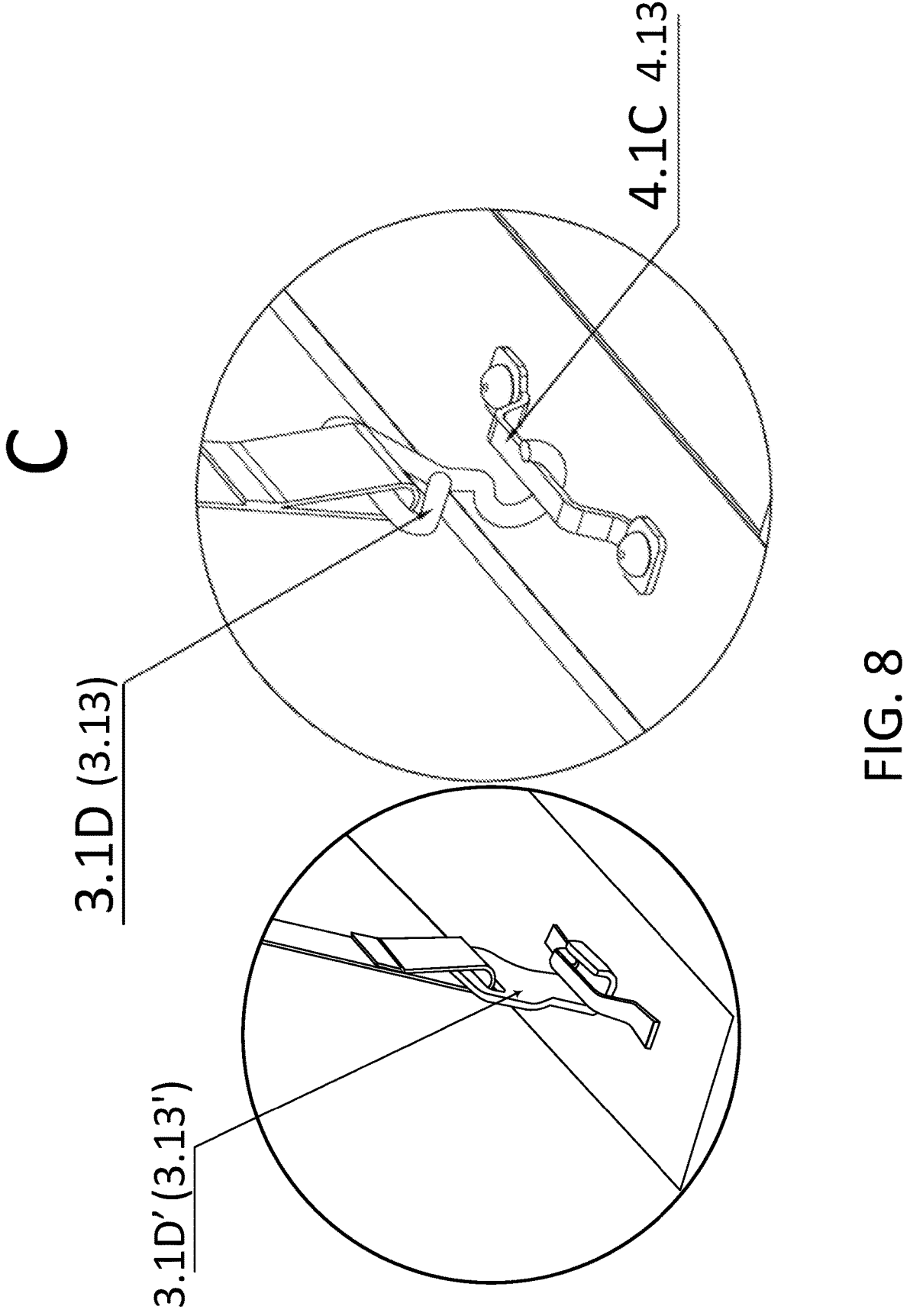
FIG. 8 shows two enlarged views of the traction component connecting to two kinds of locking components in region C in FIG. 7 according to embodiments of the present invention.

In another embodiment, FIG. 7 shows a schematic structure diagram of an apparatus for covering a vehicle carriage. Additionally, FIG. 8 shows two enlarged views of the traction component connecting to two kinds of locking components in region C in FIG. 7 according to embodiments of the present invention. These diagrams are merely examples, which should not unduly limit the scope of the claims. One of ordinary skill in the art would recognize many variations, alternatives, and modifications.

In the embodiment as shown in FIGS. 7 and 8, locking component 4.1C is provided in a form of a sleeve 4.13 that is set up for coupling with a lower end of traction component 3.1D (or 3.1D'). In an example, the lower end of traction component 3.1D (3.1D') includes a sleeve ring coupled to a hook 3.13 (or 3.13'). Hook 3.13 can be positioned between sleeve 4.13 and a mounting surface of it, and can be inserted into sleeve 4.13 to couple together. Hook 3.13' is a variation of hook 3.13 with a flat shape. As an optional feature, hook 3.13 (or 3.13') can be set as an L-shaped structure to facilitate disengagement and connection.

Figure 9:
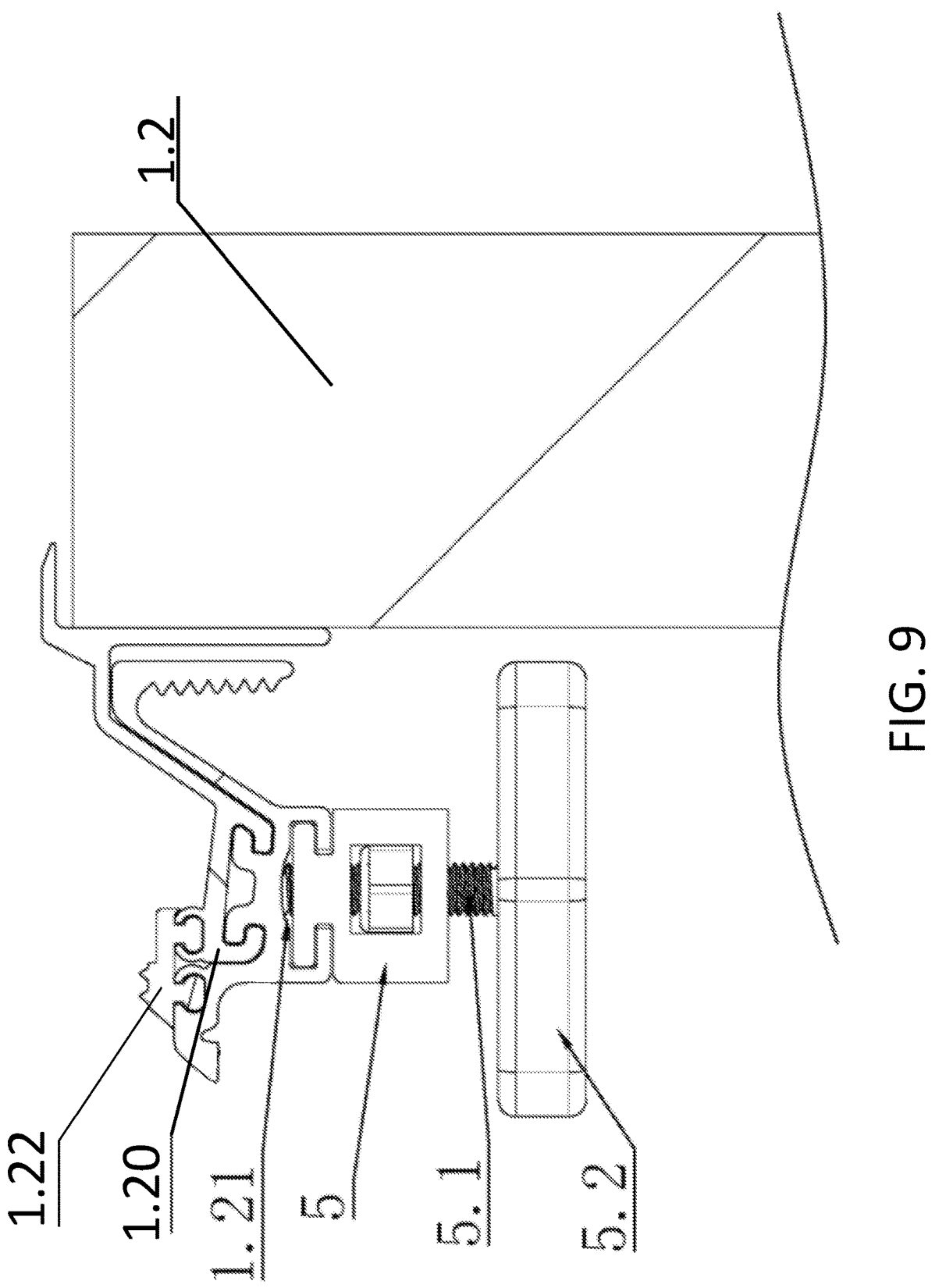
FIG. 9 is a cross-section diagram cut along SS' line in FIG. 7 according to embodiments of the present invention.

FIG. 9 is a cross-section diagram cut along SS' line in FIG. 7 according to embodiments of the present invention. This diagram is merely an example, which should not unduly limit the scope of the claims. One of ordinary skill in the art would recognize many variations, alternatives, and modifications. Referred back to FIG. 1, the carriage 1 includes a mounting component 1.20 disposed along the top rim of each side panel 1.2, which provides a base structure to install a sliding rail for mounting a sliding setter for setting a fixing component with a flexible position adjustability. As shown in the cross-section view, a slide rail 1.21 and a supporting strip 1.22 are included to affix with mounting component 1.20. Mounting component 1.20 includes stripe-shaped mounting features on both its top and bottom (we see only cross-sectional structure of these stripes). Sliding rail (a structure in strip shape) 1.21 is inserted to the stripe-shaped mounting feature at the bottom of mounting component 1.20. Sliding rail 1.21 has a rail structure facing downward and also includes a stripe-shaped mounting feature on its top that pairs with the stripe-shaped mounting feature on the top of mounting component 1.20. Then, supporting stripe 1.22 can be affixed by inserting through both stripe-shaped mounting features on top of sliding rail 1.21 and mounting component 1.20.

In the embodiment, provided with sliding rail 1.21 on side panel 1.2, a sliding setter 5 can be disposed in sliding rail 1.21 by inserting it to the rail structure from the bottom of sliding rail 1.21. Sliding setter 5, which is part of fixing assembly 4, can slide freely along sliding rail 1.21. At the same time, sliding setter 5 includes a locking rod 5.1 passing through sliding setter 5 and connected to an operating handle 5.2. Operating handle 5.2 can be adjust the locking rod to move up and down. When the locking rod 5.1 is operated by operating handle 5.2 to move towards sliding rail 1.21 and press against sliding rail 1.21, the sliding setter 5 can be kept to the current position of sliding rail 1.21. In some embodiments, sliding setter 5 provides a fixed but adjustable position for locking component 4.1E away from back plate 1.1. The position adjustability of locking component 4.1E provides adjustment to pulling force in the traction component for better controlling cover assembly 2.

Optionally, locking rod 5.1 is a screw, and the end of the screw is positioned in sliding rail 1.21 by rotating the screw through operating handle 5.2.

Figure 10:
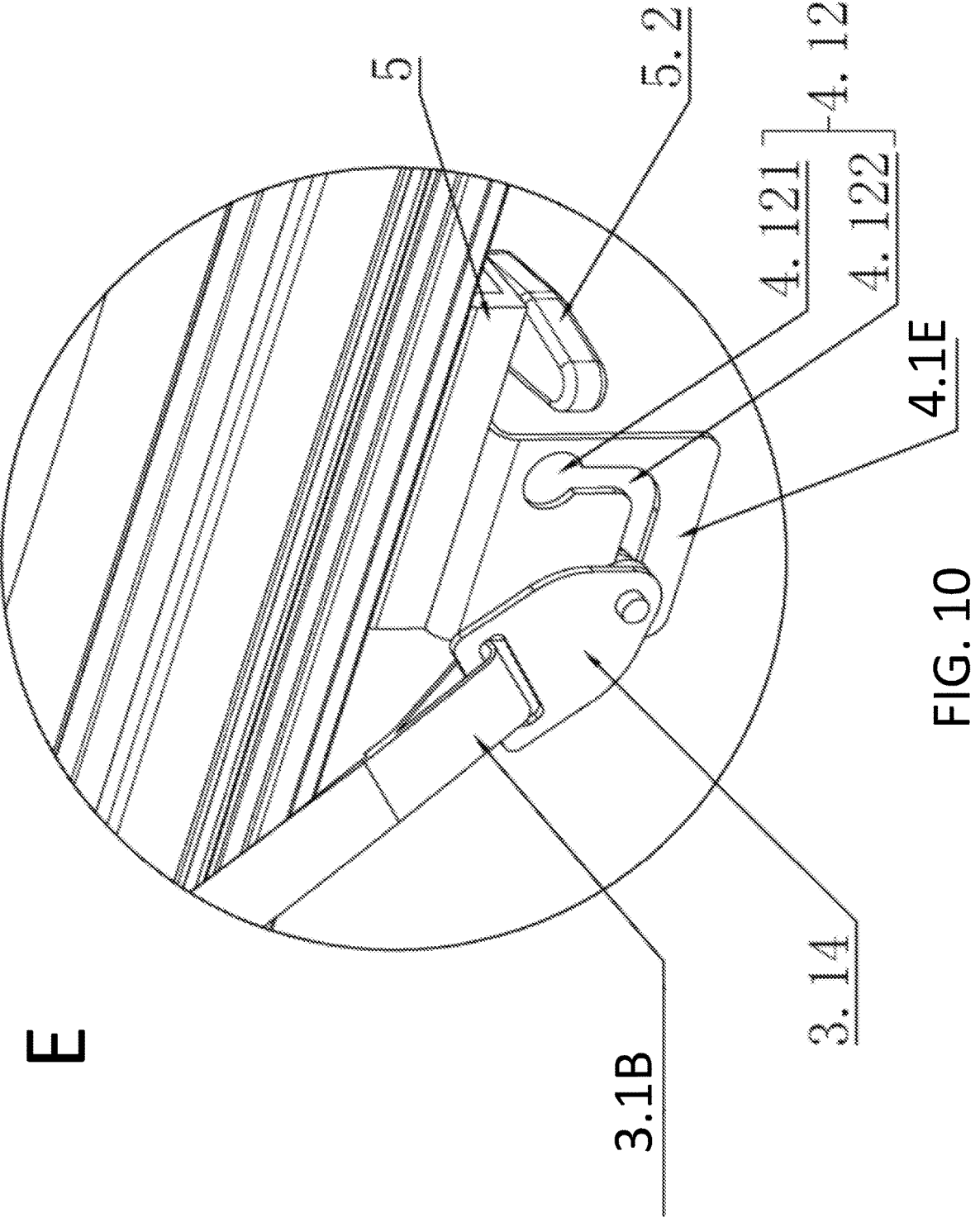
FIG. 10 is an enlarged view of a traction component connecting to a locking component in region E of FIG. 7 according to embodiments of the present invention.
Figure 11:
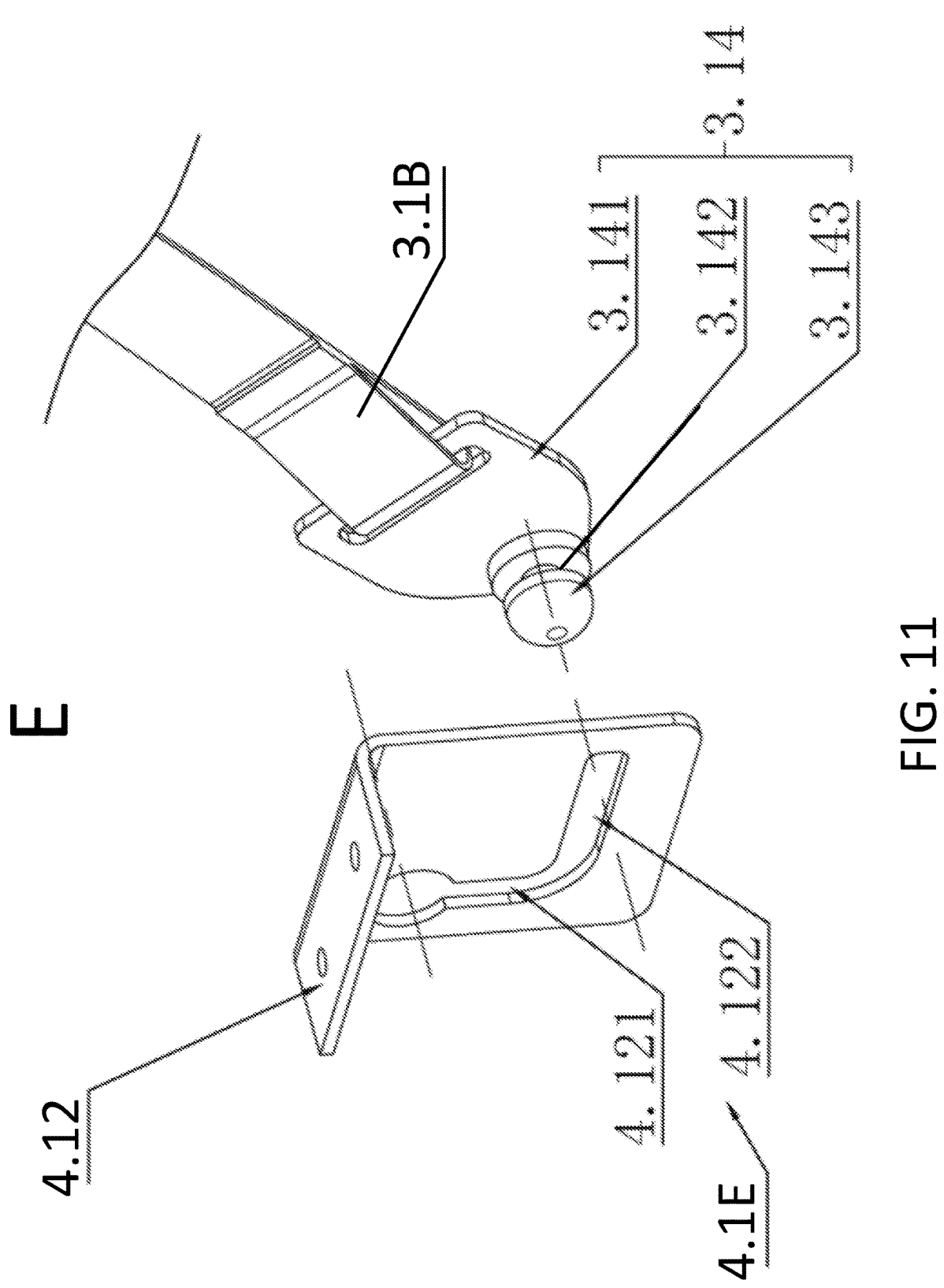
FIG. 11 is an exploded view of the traction component connecting to the locking component in FIG. 10 according to the embodiments of the present invention.

FIG. 10 is an enlarged view of a traction component connecting to a locking component in region E of FIG. 7 according to embodiments of the present invention. For better illustration purpose, FIG. 11 shows an exploded view of the traction component connecting to the locking component in FIG. 10 according to the embodiments of the present invention. These diagrams are merely examples, which should not unduly limit the scope of the claims. One of ordinary skill in the art would recognize many variations, alternatives, and modifications.

As shown in FIGS. 10 and 11, traction component 3.1B is described as a another improvement to fixing assembly 4. The lower end of traction component 3.1B is provided with sleeve ring coupled to a corner piece 3.14. Locking component 4.1E, in the embodiment, includes a locking plate 4.12 mounted from bottom to sliding setter 5. Locking plate 4.12 is provided with an L-shaped slot for corner piece 3.14 to be placed in. Corner piece 3.14 is set to be inserted from one end of the L-shaped slot and limited by the other end of the L-shaped slot in the direction of tension. Corner piece 3.14 is also restricted from being pulled out of the slot in the vertical direction relative to locking plate 4.12.

In an specific embodiment, as shown in FIG. 11, corner piece 3.14 includes at least a first section 3.141 and a second section 3.142. First section 3.141 is a plate set in the length direction of traction component 3.1B (e.g., a traction belt), and second section 3.142 is set in the vertical direction of first section 3.141. Second section 3.142 is configured to be inserted into the L-shaped slot in locking plate 4.12. In the embodiment, the L-shaped slot in locking plate 4.12 includes at least a first channel 4.121 and a second channel 4.122 with a same width. Locking plate 4.12 is vertically set and mounted to sliding setter 5 (as seen in FIG. 10). In this orientation, first channel 4.121 is also vertically set, and second channel 4.122 is horizontally set towards the direction of the cover assembly 2 in the folded state. In implementation, corner piece 3.14 is set to be inserted from an end portion of first channel 4.121 and stopped at the end of second channel 4.122 due to the pulling force exerted by traction component 3.1B.

In the specific embodiment, second section 3.142 of corner piece 3.14 is provided an end structure with an anti-detachment head 3.143 having a larger outer diameter than that of second section 3.142 and larger than the width of both the first channel and the second channel. As an option, anti-detachment head 3.143 can be a ball head. The end portion of first channel 4.121 is provided with a round opening with a diameter large enough for the ball head to be inserted into. After the ball head is inserted into the round opening end portion of first channel 4.121, second section 3.142 can carry the corner piece 3.14 to slide in the L-shaped slot and be stopped at the end of second channel 4.122. The ball head can be held in the slot, thereby achieving the restriction of corner piece 3.14 from detaching from the slot of locking plate 4.12.

Optionally, second section 3.142 of the corner piece 3.14 is also provided with a stop ring (not shown), and the distance between the stop ring and anti-detachment head 3.143 matches the thickness of locking plate 4.12, thereby improving the stability of the cooperation between corner piece 3.14 and locking plate 4.12.

As shown in FIG. 9, locking component 4.1E with locking plate 4.12 can be threaded on sliding setter 5, and sliding setter 5 is set on one side of the cover assembly 2 away from back plate 1.1 so that the traction components can connect to locking plate 4.12 to exert pulling force to maintain the balance of cover assembly 2 in a folded state. By adjusting the position of sliding setter 5, the tension at the lower end of traction component 3.1B can be released, allowing the cover assembly 2 to tilt towards one side, either near or away from back plate 1.1 (see FIG. 1, FIG. 4, and FIG. 7). Only when the traction components on one side of the cover assembly detaches from the corresponding locking components, can the traction components on other side of the cover assembly detach from the corresponding locking components.

Figure 12:
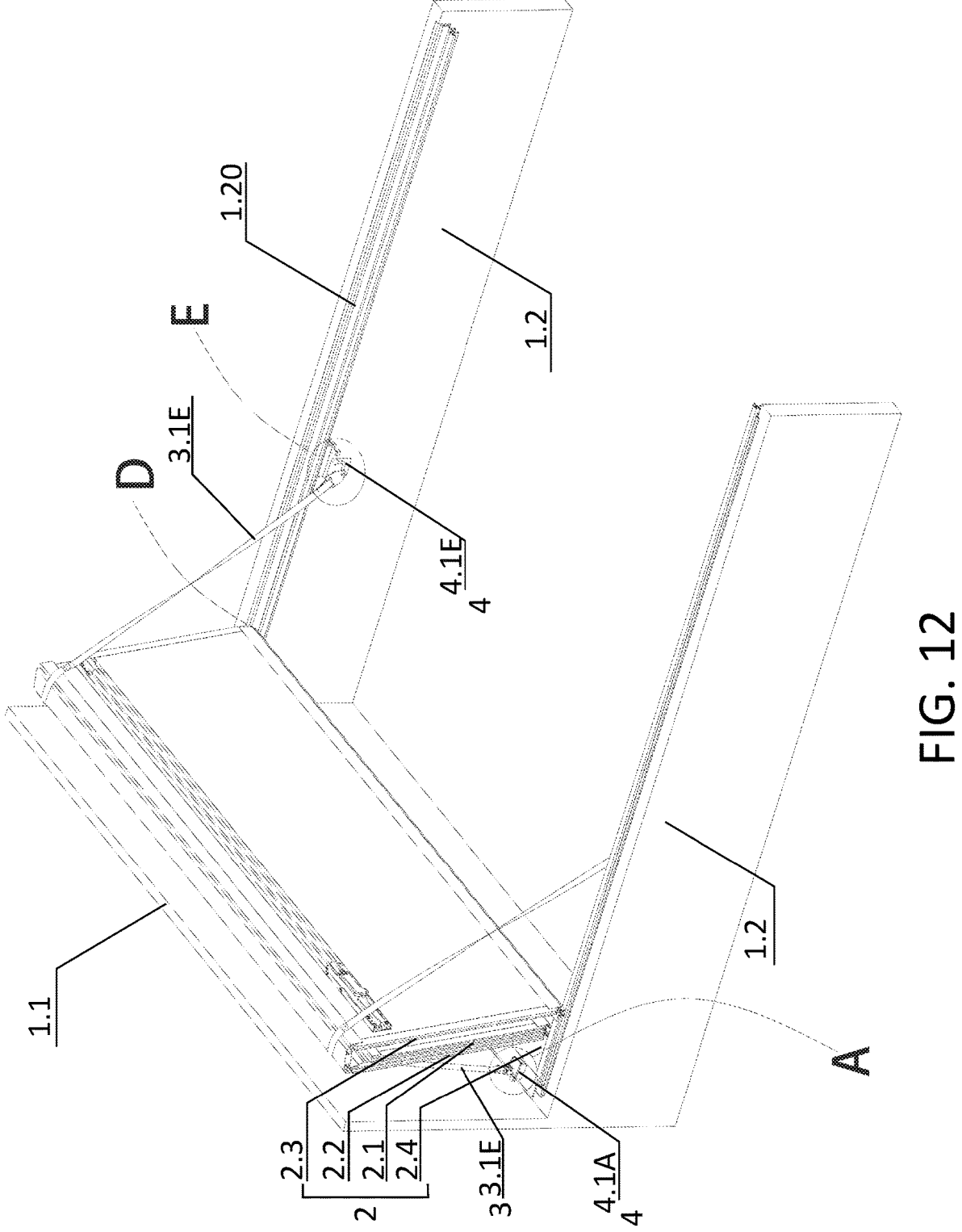
FIG. 12 is a schematic structural diagram of an apparatus for covering a vehicle carriage according to yet another embodiment of the present invention.

FIG. 12 is a schematic structural diagram of an apparatus for covering a vehicle carriage according to yet another embodiment of the present invention. This diagram is merely an example, which should not unduly limit the scope of the claims. One of ordinary skill in the art would recognize many variations, alternatives, and modifications. In the embodiment, the apparatus is provided with a carriage having a back plate 1.1 and two side panels 1.2. A mounting component 1.20 is installed along the top rim of each side panel 1.2. The apparatus also includes a cover assembly 2 mounted on the carriage. Cover assembly 2 includes multiple hinged movable cover plates that can be folded or laid flat on the carriage. The cover assembly 2, as shown in FIG. 12, is in a folded state with three folded cover plates, i.e., a first cover plate 2.1, a second cover plate 2.2, and a third cover plate 2.3 being folded towards back plate 1.1 to make the carriage open, and one movable cover plate 2.4 being laid flat on the side panels 1.2 near back plate 1.1.

The apparatus also includes a traction assembly 3 and a fixing assembly 4. Traction assembly 3 may include two traction components 3.1E, optionally, a soft fabric strap, with their two ends respectively configured to at one side near back plate 1.1 be fixed by locking components 4.1A of fixing assembly 4 and crossing over cover assembly 2 at the other side away from the back plate be fixed by locking component 4.1E. The description of locking component 4.1A has been shown in FIG. 2 and FIG. 3. The description of lock component 4.1E has been shown in FIG. 10 and FIG. 11. The traction component 3.1E may include one end near back plate 1.1 configured to have a sleeve ring coupled to a hook portion like traction component 3.1A (see FIG. 2) and another end away from the back plate configured to have a sleeve ring coupled to a corner piece like traction component 3.1B (see FIG. 10 and FIG. 11).

Figure 13:
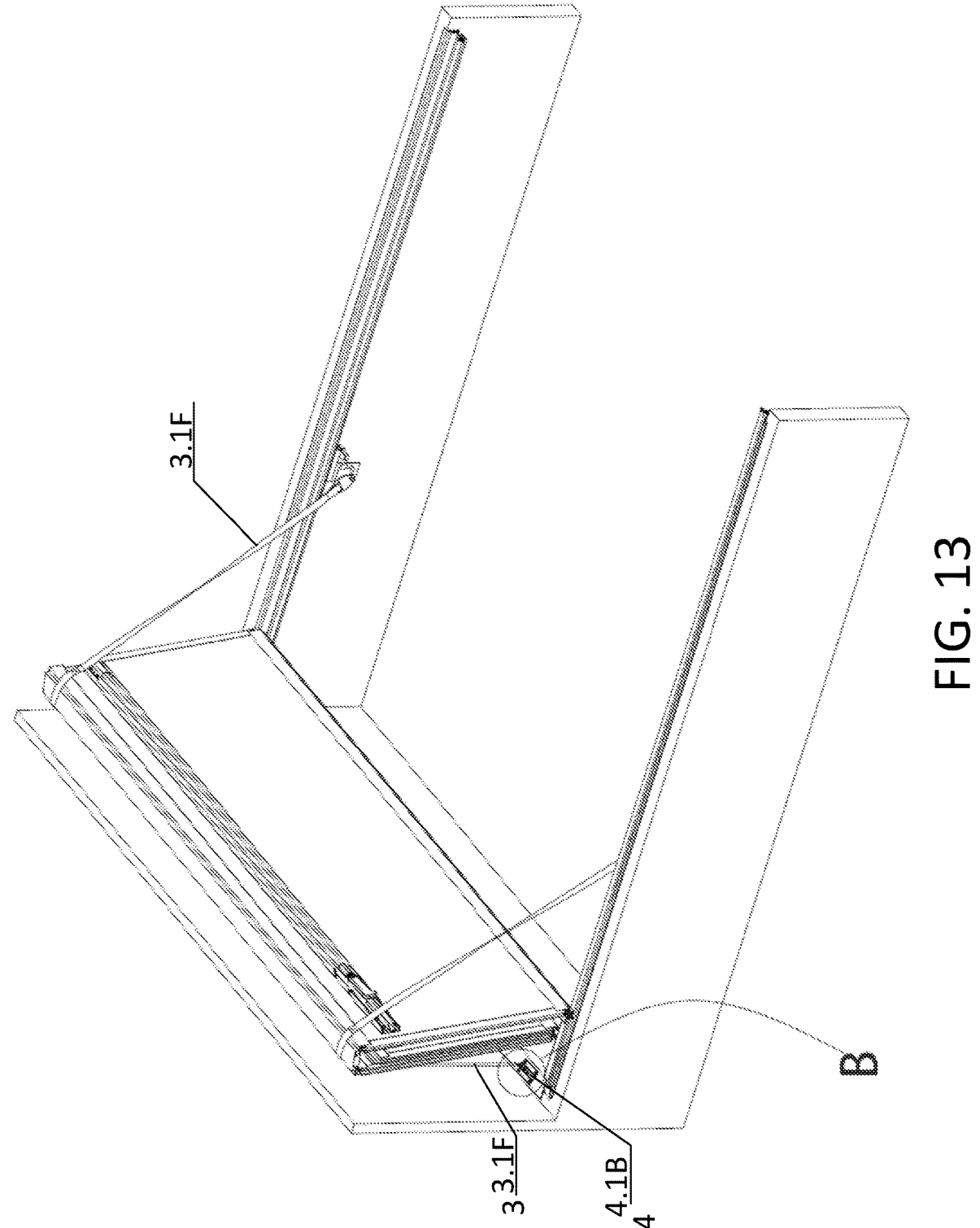
FIG. 13 is a schematic structural diagram of an apparatus for covering a vehicle carriage according to still another embodiment of the present invention.

FIG. 13 is a schematic structural diagram of an apparatus for covering a vehicle carriage according to still another embodiment of the present invention. This diagram is merely an example, which should not unduly limit the scope of the claims. One of ordinary skill in the art would recognize many variations, alternatives, and modifications. In the embodiment, the apparatus is provided the same as one shown in FIG. 12 except that traction component 3.1F replaces 3.1E and locking component 4.1B replaces 4.1A. The description of locking component 4.1B has been shown in FIG. 5 and FIG. 6. Traction component 3.1F may include one end near back plate 1.1 configured to have a sleeve ring like traction component 3.1C (see FIG. 6) and another end away from the back plate configured to have a sleeve ring coupled to a corner piece like traction component 3.1B (see FIG. 10 and FIG. 11).

Figure 14:
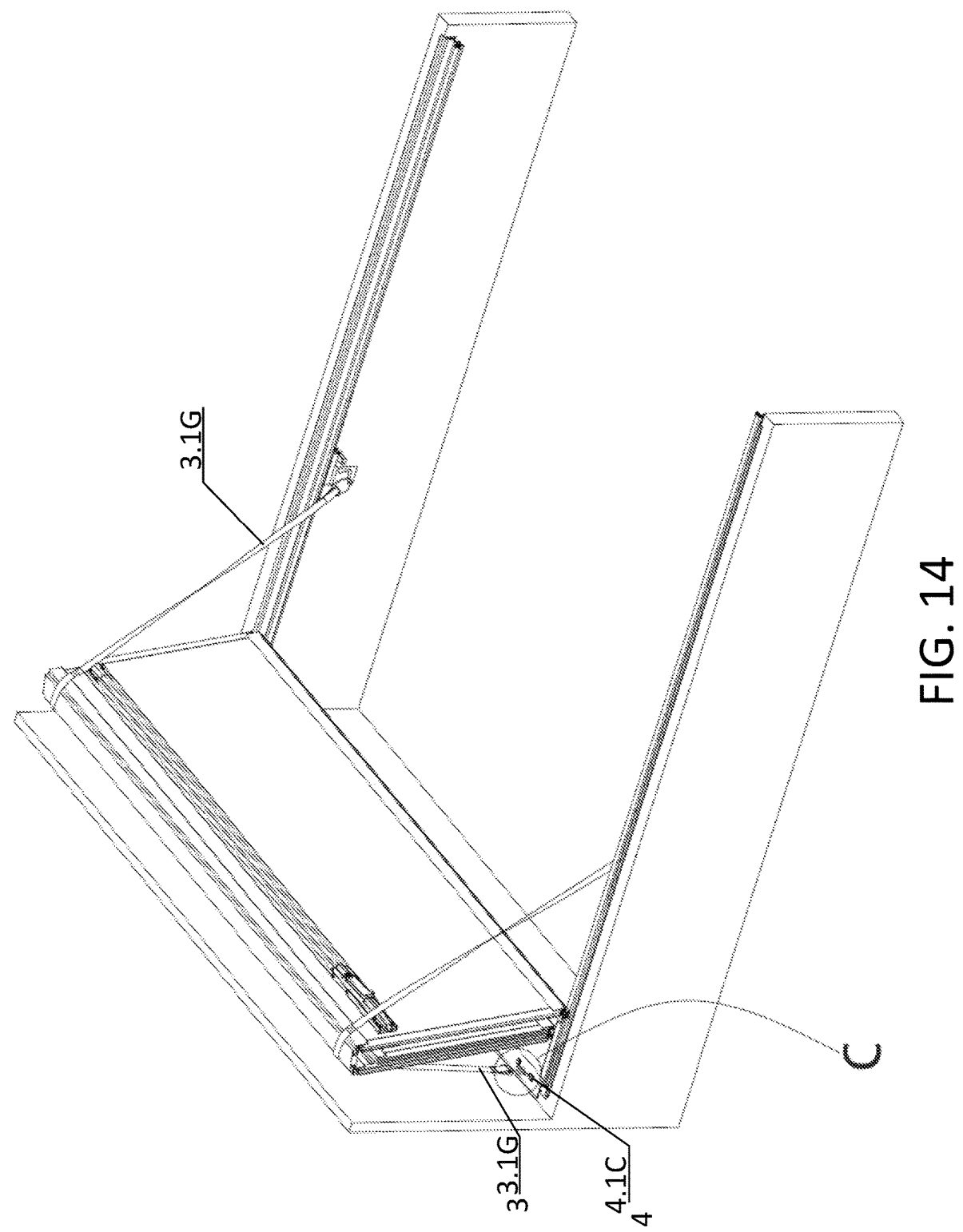
FIG. 14 is a schematic structural diagram of an apparatus for covering a vehicle carriage according to still yet another embodiment of the present invention.

FIG. 14 is a schematic structural diagram of an apparatus for covering a vehicle carriage according to still yet another embodiment of the present invention. This diagram is merely an example, which should not unduly limit the scope of the claims. One of ordinary skill in the art would recognize many variations, alternatives, and modifications. In the embodiment, the apparatus is provided the same as one shown in FIG. 12 except that traction component 3.1G replaces 3.1E and locking component 4.1C replaces 4.1A. The description of locking component 4.1C has been shown in FIG. 8. Traction component 3.1G may include one end near back plate 1.1 configured to have a sleeve ring coupled to a hook like traction component 3.1D (see FIG. 8) and another end away from the back plate configured to have a sleeve ring coupled to a corner piece like traction component 3.1B (see FIG. 10 and FIG. 11).

Figure 15:
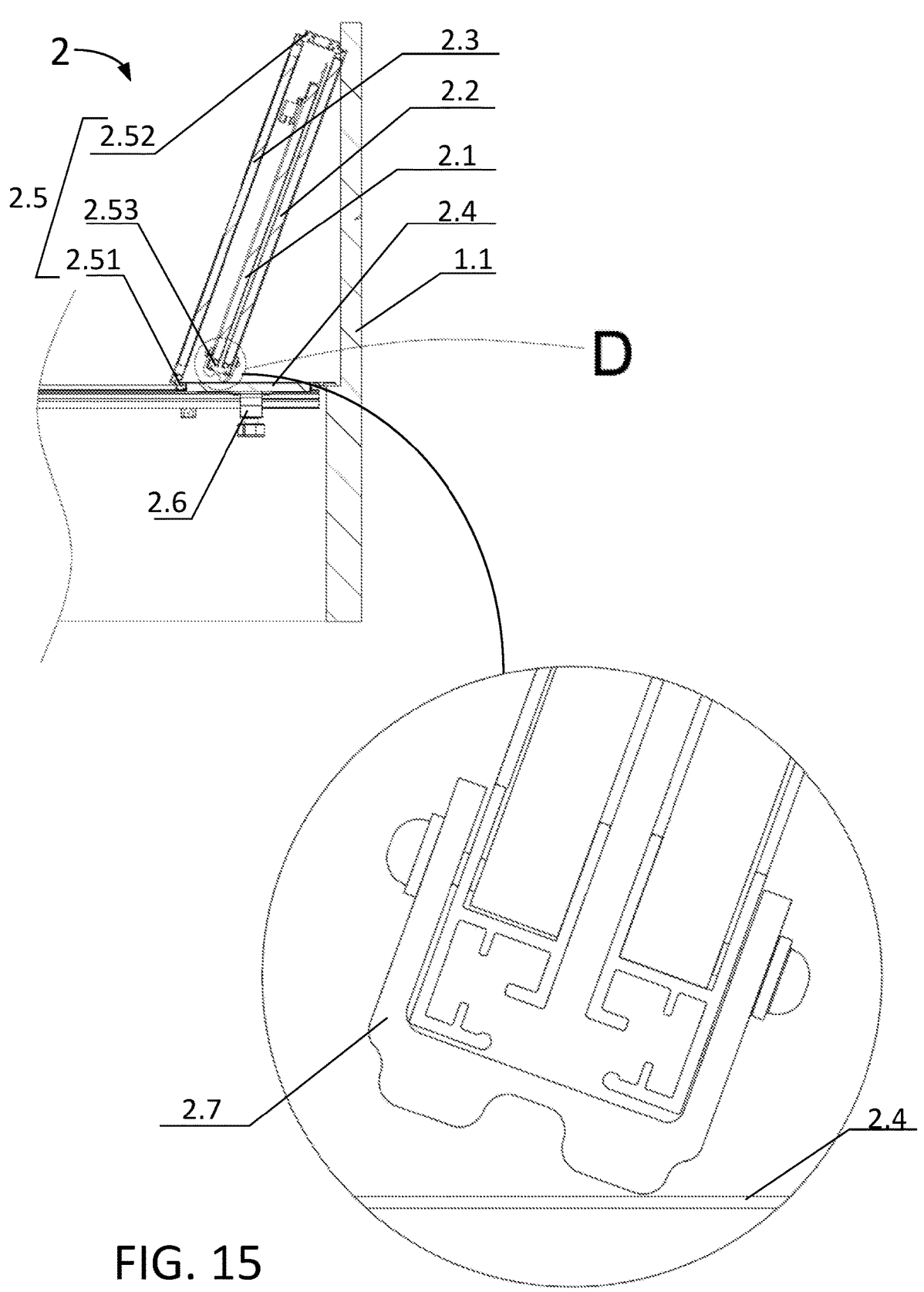
FIG. 15 is a side view of a cover assembly for covering a vehicle carriage and an enlarged view of region D according to embodiments of the present invention.

FIG. 15 is a side view of a cover assembly for covering a vehicle carriage and an enlarged view of region D according to embodiments of the present invention. This diagram is merely an example, which should not unduly limit the scope of the claims. One of ordinary skill in the art would recognize many variations, alternatives, and modifications. As shown, cover assembly 2 is in a folded state with the first cover plate 2.1, the second cover plate 2.2, and third cover plate 2.3 being sequentially hinged and folded toward back plate 1.1 of the carriage. A cover plate 2.4 is laid flat near back plate 1.1, which may be movable along top rims of two side panels of the carriage. Optionally, cover plate 2.4 is set to its current position near back plate 1.1 by using a setter 2.6. Third cover plate 2.3 is coupled to cover plate 2.4 via a first hinge 2.51, second cover plate 2.2 is coupled to third cover plate 2.3 by a second hinge 2.52, and first cover plate 2.1 is coupled to second cover plate 2.2 by a third hinge 2.53. Second hinge 2.52, in the embodiment, is made with a greater length to allow first cover plate 2.1 being accommodated between second cover plate 2.2 and third cover plate 2.3 in the fully folded state. Cover assembly 2 may be deployed flat sequentially with the movable cover plate 2.4, third cover plate 2.3, second cover plate 2.2, and first cover plate 2.1 to cover the carriage.

The enlarged view of region D also shows that the cover assembly 2 may include a hinge protector 2.7 to wrap around the third hinge 2.53. Hinge protector 2.7 is a soft material that may be flexibly folded or flattened while is strong enough to be mounted to the two adjacent cover plates. Since the third hinged region is a location that rests on the movable cover plate 2.4 when the cover assembly is in the folded state, the soft and strong material of hinge protector 2.7 can prevent the hinge structure being damaged by wear between it and the surface of cover plate 2.4.

Figure 16:
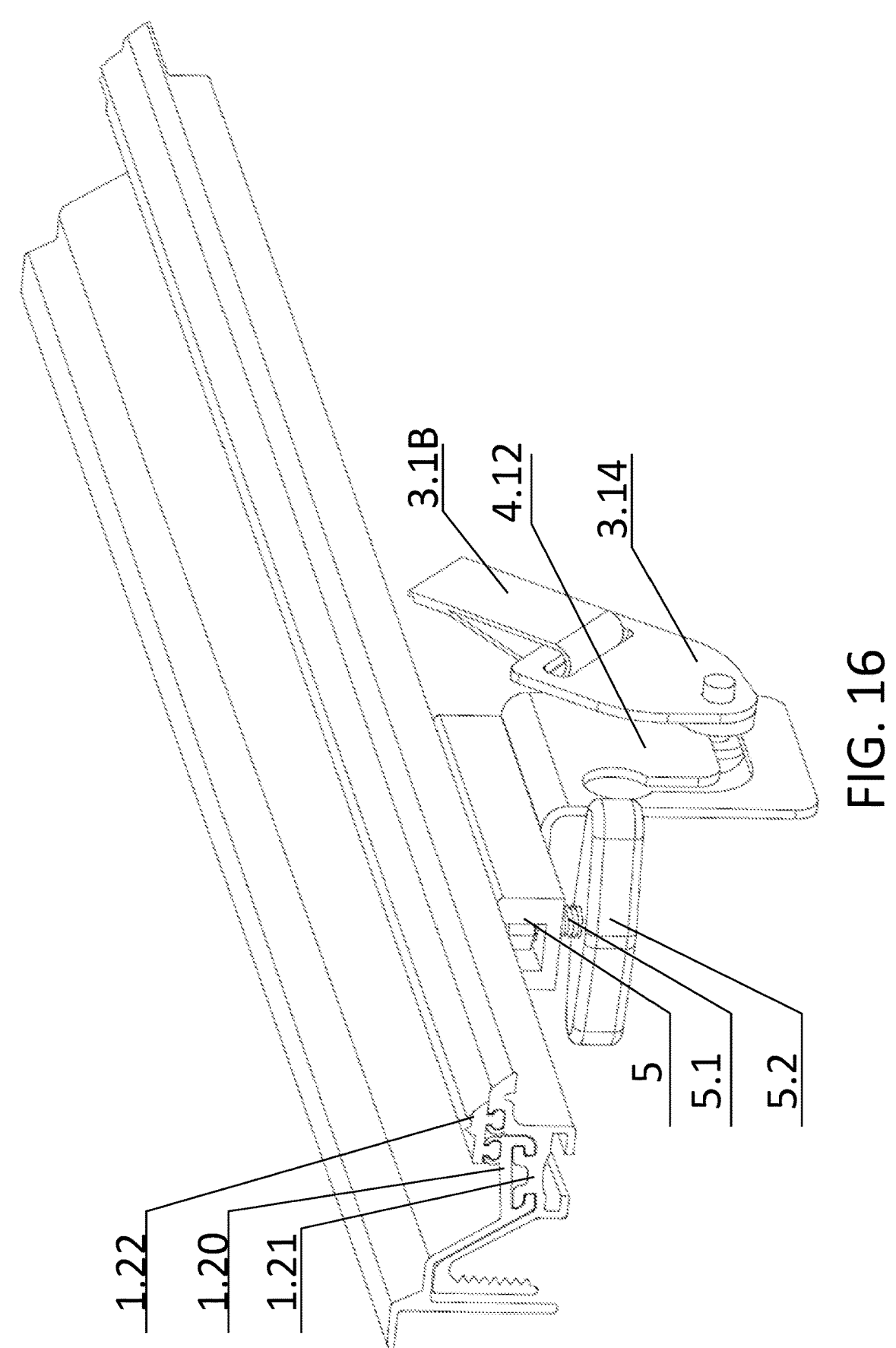
FIG. 16 is a schematic structural diagram of a sliding rail installed on a mounting component and a sliding setter installed to the sliding rail according to embodiments of the present invention.
Figure 17:
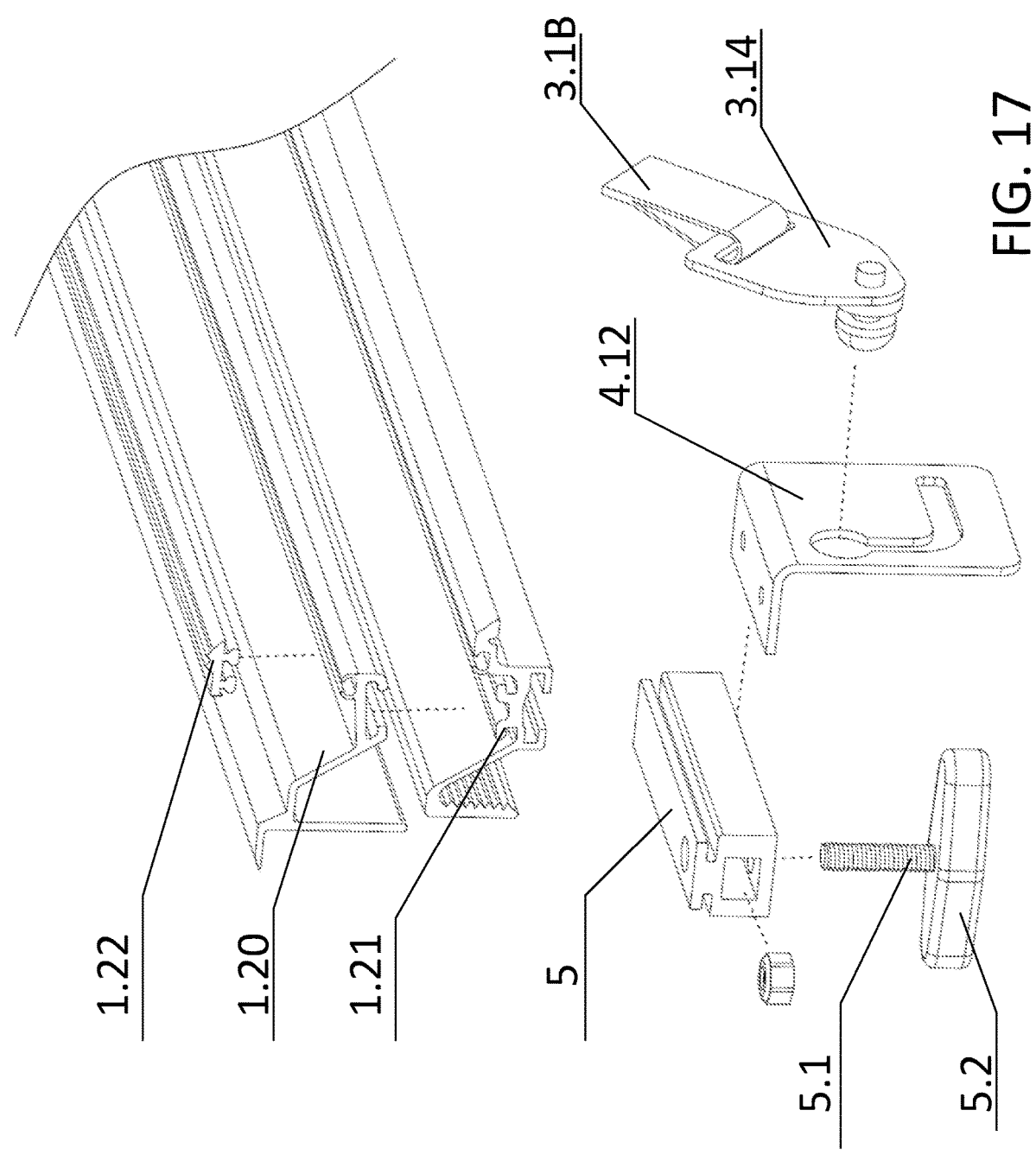
FIG. 17 is an exploded view of the structure in FIG. 16 according to embodiments of the present invention.

FIG. 16 is a schematic structural diagram of a sliding rail installed on a mounting component and a sliding setter installed to the sliding rail according to embodiments of the present invention. This diagram is merely an example, which should not unduly limit the scope of the claims. One of ordinary skill in the art would recognize many variations, alternatives, and modifications. FIG. 16 further shows a perspective view of mounting component 1.20 (disposed to a top rim of a side panel of the carriage) is set to be a base structure for affixing a sliding rail 1.21 from the bottom of mounting component 1.20 and a supporting strip 1.22 from the top portions of both mounting component 1.20 and sliding rail 1.21. Additionally, a sliding setter 5 is attached to sliding rail 1.21 from its bottom by using an operating handle 5.2 to drive a locking rod 5.1 towards the bottom of rail structure. Furthermore, a locking plate 4.12 is fixed from below to sliding setter 5. An end portion of a traction component 3.1B includes a corner piece 3.14 inserted into a L-shaped slot within locking plate 4.12 and limited by an end of the horizontal channel of the L-shaped slot. FIG. 17 shows an exploded view of the structure in FIG. 16 to give another illustration of each of all components that are assembled together in FIG. 16.

As another optional feature, hook 3.13 can be selected as a U-shaped structure, with one end of the U-shape shorter than the other end, to increase the stability of the fit between the locking component 4.1 and traction component 3.1 in various embodiments.

As another optional feature, multiple connection holes are opened on the sleeve 4.13, and the hook 3.13 can be hung in one of them to achieve connection.

It should be noted that the above embodiments can be applied to the lower end of any traction component 3.1 and are not limited to the locking component 4.1 near back plate 1.1 or away from back plate 1.1 but can be selectively applied to any locking component 4.1.

In addition, under the premise that the space in carriage 1 allows, the embodiment two can also be applied to both sides of fixing assembly 4, which is not limited to the embodiments mentioned above, or to locking component 4.1 that can be thought of according to the above embodiments in the technical field.

In the above embodiments, the traction component can be optionally selected as a soft fabric strap or other flexible materials with sufficient strength.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus for covering a carriage comprising:
a cover assembly comprising a plurality of articulated movable plates configured to have two or more plates sequentially folded together in a standing position relative to be an unfolded plate laid horizontally;
a fixing assembly comprising at least a first locking component and a second locking component respectively arranged at two locations from opposite directions of the cover assembly in the standing position; and
a traction assembly, comprising at least a first traction component and a second traction component configured to respectively connect the first locking component and the second locking component to the cover assembly in the standing position from the opposite directions; the first traction component and the second traction component exerting traction forces from the opposite directions via the first locking component and the second locking component to maintain the cover assembly in the standing position stable relative to the carriage;
wherein the first locking component comprises a latch comprising a latch base disposed with a plug pin against a second elastic element, and the first traction component comprises a sleave ring configured to connect the first locking component by passing the plug pin to through the sleeve ring.

2. The apparatus of claim 1 wherein the unfolded plate is movable horizontally along a support strip configured to mount on the carriage.

3. The apparatus of claim 2 wherein the two or more plates sequentially folded together comprises a first cover plate, a second cover plate, and a third cover plate; the third cover plate being coupled to the unfolded plate by a first hinge, the second cover plate being coupled to the third cover plate by a second hinge, the first cover plate being coupled to the second cover plate by a third hinge, the second hinge being configured to be greater in length than the first hinge and the third hinge to allow the first cover plate being folded between the second cover plate and the third cover plate in the standing position.

4. The apparatus of claim 2 wherein the cover assembly further comprises a setter configured to set the unfolded plate to a position on the support strip.

5. The apparatus of claim 1 wherein the cover assembly further comprises a flexible connector configured to protect the third hinge that rests on the unfolded plate laid horizontally.

6. The apparatus of claim 1 wherein the first locking component comprises a lock housing, a first elastic element, and a latching element, the lock housing comprising an inner cavity and a top opening, the latching element in L-shape comprising a snap portion and a pressing portion with a guiding slope, the first elastic element and the latching element being disposed in the inner cavity with an end of the pressing portion sticking out of the lock housing and an end of the snap portion pressing against the first elastic element.

7. The apparatus of claim 6 wherein the first traction component comprises a long stretched portion, a first end portion and a second end portion, the first end portion comprising a sleeve ring coupled to a hooking portion, the hook portion being configured to be locked by the first locking component by inserting through the top opening of the lock housing and pressing along the guided slope of the snap portion, and also unlocked by pressing the pressing portion against the first elastic element; the second end portion comprising a hook configured to insert a sleeve mounted on the cover assembly.

8. The apparatus of claim 1 wherein the fixing assembly further comprises a sliding setter engaged to a sliding rail configured to mount on the carriage, the sliding setter comprising a locking rod connected to an operating handle, the operating handle being configured to move the locking rod through the sliding setter to either tightly press the against the sliding rail at a fixed position or release the locking rod to allow the sliding setter to be movable along the sliding rail.

9. The apparatus of claim 8 wherein the second locking component comprises a locking plate vertically affixed to the sliding setter, the locking plate comprising an L-shaped through-plate slot including a first channel in the vertical direction that connects to a second channel in the horizontal orientation, the first channel and the second channel having a same width, the first channel having a rounded end portion that is bigger than the width and the second channel having an end portion of the same width.

10. The apparatus of claim 9 wherein the second traction component comprises a long stretched portion, a first end portion and a second end portion, the first end portion comprising a corner piece comprising a first section with a flat plate set in parallel to the locking plate and a second section set in perpendicular to the locking plate, the second section having an anti-detachment head configured to be inserted through the rounded end portion and moved along the L-shaped through-plate slot and stopped at the end portion of the second channel; the second end portion comprising a hook configured to insert a sleeve mounted on the cover assembly.

11. The apparatus of claim 1 wherein the first locking component comprises a sleave, and the first traction component comprises a hook configured to connect the first locking component by inserting the hook through the sleave.

12. An apparatus for covering a carriage comprising:
   a cover assembly comprising a plurality of articulated movable plates configured to be a folded state in a standing position or be deployed in a flat position for covering the carriage;
   a fixing assembly comprising at least one first locking component and two second locking components, the at least one first locking component being fixed at one side of the cover assembly folded in the standing position and the two second locking components being adjustably set at another side of the cover assembly in the standing position along two sliding rails configured to mount to the carriage; and
   a traction assembly, comprising two traction components, each of the two traction components comprising a fabric strap stretched crossing the cover assembly in the standing position, the fabric strap comprising one end portion connected to the at least one first locking component and another end portion connected to respective one of the two second locking components, the two traction components being configured to maintain the cover assembly folded in the standing position stable relative to the carriage by exerting a pulling force through both the first locking component and the two second locking components.

13. The apparatus of claim 12 wherein the plurality of articulated movable plates comprises a movable cover plate, a third cover plate, a second cover plate, and a first cover plate sequentially hinged together; the movable cover plate being laid in the flat position, the first cover plate, the second cover plate, and the third cover plate being configured to sequentially fold towards the movable cover plate with the first cover plate being accommodated between the second cover plate and the third cover plate.

14. The apparatus of claim 13 wherein the cover assembly further comprises a setter configured to set the movable cover plate into a position on a support strip configured to mount on the carriage or to release setting to allow the movable cover plate movable along a length direction of the support strip.

15. The apparatus of claim 12 wherein the first locking component comprises a lock housing, a first elastic element, and a latching element, the lock housing comprising an inner cavity and a top opening, the latching element in L-shape comprising a snap portion with a guiding slope and a pressing portion in a longer length, the first elastic element and the latching element being disposed in the inner cavity with one side surface of the latching element pressing against the first elastic element and the pressing portion partially sticking out of the lock housing in a direction opposite to the first elastic element.

16. The apparatus of claim 15 wherein each of the two traction components comprises a first end portion including a sleeve ring coupled to a hooking portion, the hook portion being configured to be locked into the first locking component by inserting through the top opening of the lock housing and pressing along the guided slope of the snap portion, and also unlocked by pressing the pressing portion against the first elastic element.

17. The apparatus of claim 12 wherein the fixing assembly further comprises a pair of sliding setters respectively engaged to two sliding rails configured to mount on the carriage, each sliding setter comprising a locking rod connected to an operating handle, being configured to use the operating handle to press the locking rod to either tightly against the respective one sliding rail at a fixed position or release the locking rod to allow the sliding setter movable along the sliding rail.

18. The apparatus of claim 17 wherein the second locking component comprises a locking plate vertically affixed to the sliding setter, the locking plate comprising an L-shaped through-plate slot including a first channel in the vertical direction that connects to a second channel in the horizontal orientation, the first channel and the second channel having a same width, the first channel having a rounded end portion that is bigger than the width and the second channel having an end portion of the same width.

19. The apparatus of claim 18 wherein each of the two traction components comprises a second end portion including a sleeve ring coupled to a corner piece, the cover piece comprising a first section with a flat plate set in parallel to the locking plate and a second section set in perpendicular to the locking plate, the second section comprising an anti-detachment head configured to be inserted through the rounded end portion and moved along the first channel to the second channel and stopped at the end portion of the second channel.

* * * * *